US008938063B1

(12) United States Patent
Hackbarth et al.

(10) Patent No.: US 8,938,063 B1
(45) Date of Patent: Jan. 20, 2015

(54) CONTACT CENTER SERVICE MONITORING AND CORRECTING

(75) Inventors: Kenneth R. Hackbarth, Westminster, CO (US); Murray Jenson, Lakewood, CO (US); Sarah H. Kiefhaber, Longmont, CO (US); Joylee Kohler, Northglenn, CO (US)

(73) Assignee: Avaya Inc., Basking Ridge, NJ (US)

( * ) Notice: Subject to any disclaimer, the term of this patent is extended or adjusted under 35 U.S.C. 154(b) by 2006 days.

(21) Appl. No.: 11/517,646

(22) Filed: Sep. 7, 2006

(51) Int. Cl.
*H04M 3/00* (2006.01)
*H04M 5/00* (2006.01)

(52) U.S. Cl.
USPC ............................... 379/265.06; 379/265.03

(58) Field of Classification Search
USPC ............ 379/265.01, 265.03, 265.05, 265.06, 379/265.07, 265.08, 265.11, 265.12, 379/265.13, 265.14
See application file for complete search history.

(56) References Cited

U.S. PATENT DOCUMENTS

| | | | |
|---|---|---|---|
| 4,163,124 A | 7/1979 | Jolissaint | |
| 4,510,351 A | 4/1985 | Costello et al. | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland et al. | |
| 5,155,761 A | 10/1992 | Hammond | |
| 5,164,981 A | 11/1992 | Mitchell et al. | |
| 5,164,983 A | 11/1992 | Brown et al. | |
| 5,167,010 A | 11/1992 | Elm et al. | |
| 5,185,780 A | 2/1993 | Leggett | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,289,368 A | 2/1994 | Jordan et al. | |
| 5,291,550 A | 3/1994 | Levy et al. | |
| 5,299,260 A | 3/1994 | Shaio | |
| 5,309,513 A | 5/1994 | Rose | |
| 5,311,422 A | 5/1994 | Loftin et al. | |
| 5,325,292 A | 6/1994 | Crockett | |
| 5,335,268 A | 8/1994 | Kelly, Jr. et al. | |
| 5,335,269 A | 8/1994 | Steinlicht | |

(Continued)

FOREIGN PATENT DOCUMENTS

CA 2143198 1/1995
CA 2174762 3/1996

(Continued)

OTHER PUBLICATIONS

Koutarou, "Building a Framework for EC using Hibernate, OSWorkflow", Java Press, Japan, Gujutsu Hyouron Company, vol. 25, 2004, pp. 132-147.

(Continued)

*Primary Examiner* — Nafiz E Hoque
(74) *Attorney, Agent, or Firm* — Sheridan Ross P.C.

(57) ABSTRACT

A contact center is provided that includes a plurality of agents for servicing incoming contacts and an event manager that is operable to monitor various administrative changes made within the contact center, determine if those changes had a positive or negative effect on the contact center performance (either locally or globally), and reverse the change if it is determined that the change resulted in negative effect on the contact center.

24 Claims, 9 Drawing Sheets

(56) References Cited

U.S. PATENT DOCUMENTS

| | | | |
|---|---|---|---|
| 5,390,243 | A | 2/1995 | Casselman et al. |
| 5,436,965 | A | 7/1995 | Grossman et al. |
| 5,444,774 | A | 8/1995 | Friedes |
| 5,467,391 | A | 11/1995 | Donaghue, Jr. et al. |
| 5,469,503 | A | 11/1995 | Butensky et al. |
| 5,469,504 | A | 11/1995 | Blaha |
| 5,473,773 | A | 12/1995 | Aman et al. |
| 5,479,497 | A | 12/1995 | Kovarik |
| 5,499,291 | A | 3/1996 | Kepley |
| 5,500,795 | A | 3/1996 | Powers et al. |
| 5,504,894 | A | 4/1996 | Ferguson et al. |
| 5,506,898 | A | 4/1996 | Costantini et al. |
| 5,530,744 | A | 6/1996 | Charalambous et al. |
| 5,537,470 | A | 7/1996 | Lee |
| 5,537,542 | A | 7/1996 | Eilert et al. |
| 5,544,232 | A | 8/1996 | Baker et al. |
| 5,546,452 | A | 8/1996 | Andrews et al. |
| 5,555,299 | A | 9/1996 | Maloney et al. |
| 5,577,169 | A | 11/1996 | Prezioso |
| 5,592,378 | A | 1/1997 | Cameron et al. |
| 5,592,542 | A | 1/1997 | Honda et al. |
| 5,594,726 | A | 1/1997 | Thompson et al. |
| 5,603,029 | A | 2/1997 | Aman et al. |
| 5,604,892 | A | 2/1997 | Nuttall et al. |
| 5,606,361 | A | 2/1997 | Davidsohn et al. |
| 5,611,076 | A | 3/1997 | Durflinger et al. |
| 5,627,884 | A | 5/1997 | Williams et al. |
| 5,642,515 | A | 6/1997 | Jones et al. |
| 5,673,205 | A | 9/1997 | Brunson |
| 5,684,872 | A | 11/1997 | Flockhart et al. |
| 5,684,874 | A | 11/1997 | Yagyu et al. |
| 5,684,964 | A | 11/1997 | Powers et al. |
| 5,689,698 | A | 11/1997 | Jones et al. |
| 5,703,943 | A | 12/1997 | Otto |
| 5,713,014 | A | 1/1998 | Durflinger et al. |
| 5,721,770 | A | 2/1998 | Kohler |
| 5,724,092 | A | 3/1998 | Davidsohn et al. |
| 5,740,238 | A | 4/1998 | Flockhart et al. |
| 5,742,675 | A | 4/1998 | Kilander et al. |
| 5,742,763 | A | 4/1998 | Jones |
| 5,748,468 | A | 5/1998 | Notenboom et al. |
| 5,749,079 | A | 5/1998 | Yong et al. |
| 5,751,707 | A | 5/1998 | Voit et al. |
| 5,752,027 | A | 5/1998 | Familiar |
| 5,754,639 | A | 5/1998 | Flockhart et al. |
| 5,754,776 | A | 5/1998 | Hales et al. |
| 5,754,841 | A | 5/1998 | Carino, Jr. |
| 5,757,904 | A | 5/1998 | Anderson |
| 5,781,614 | A | 7/1998 | Brunson |
| 5,784,452 | A | 7/1998 | Carney |
| 5,787,410 | A | 7/1998 | McMahon |
| 5,790,642 | A | 8/1998 | Taylor et al. |
| 5,790,650 | A | 8/1998 | Dunn et al. |
| 5,790,677 | A | 8/1998 | Fox et al. |
| 5,794,250 | A | 8/1998 | Carino, Jr. et al. |
| 5,796,393 | A | 8/1998 | MacNaughton et al. |
| 5,802,282 | A | 9/1998 | Hales et al. |
| 5,802,510 | A | 9/1998 | Jones |
| 5,818,907 | A | 10/1998 | Maloney et al. |
| 5,819,084 | A | 10/1998 | Shapiro et al. |
| 5,825,869 | A | 10/1998 | Brooks et al. |
| 5,826,039 | A | 10/1998 | Jones |
| 5,828,747 | A | 10/1998 | Fisher et al. |
| 5,836,011 | A | 11/1998 | Hambrick et al. |
| 5,838,968 | A | 11/1998 | Culbert |
| 5,839,117 | A | 11/1998 | Cameron et al. |
| 5,864,874 | A | 1/1999 | Shapiro |
| 5,875,437 | A | 2/1999 | Atkins |
| 5,880,720 | A | 3/1999 | Iwafune et al. |
| 5,881,238 | A | 3/1999 | Aman et al. |
| 5,884,032 | A | 3/1999 | Bateman et al. |
| 5,889,956 | A | 3/1999 | Hauser et al. |
| 5,897,622 | A | 4/1999 | Blinn et al. |
| 5,903,641 | A * | 5/1999 | Tonisson ............... 379/265.12 |
| 5,903,877 | A | 5/1999 | Berkowitz et al. |
| 5,905,793 | A | 5/1999 | Flockhart et al. |
| 5,909,669 | A | 6/1999 | Havens |
| 5,911,134 | A | 6/1999 | Castonguay et al. |
| 5,914,951 | A | 6/1999 | Bentley et al. |
| 5,915,012 | A | 6/1999 | Miloslavsky |
| 5,923,745 | A | 7/1999 | Hurd |
| 5,926,538 | A | 7/1999 | Deryugin et al. |
| 5,930,786 | A | 7/1999 | Carino, Jr. et al. |
| 5,937,051 | A | 8/1999 | Hurd et al. |
| 5,937,402 | A | 8/1999 | Pandit |
| 5,940,496 | A | 8/1999 | Gisby et al. |
| 5,943,416 | A | 8/1999 | Gisby |
| 5,948,065 | A | 9/1999 | Eilert et al. |
| 5,960,073 | A | 9/1999 | Kikinis et al. |
| 5,963,635 | A | 10/1999 | Szlam et al. |
| 5,963,911 | A | 10/1999 | Walker et al. |
| 5,970,132 | A | 10/1999 | Brady |
| 5,974,135 | A | 10/1999 | Breneman et al. |
| 5,974,462 | A | 10/1999 | Aman et al. |
| 5,982,873 | A | 11/1999 | Flockhart et al. |
| 5,987,117 | A | 11/1999 | McNeil et al. |
| 5,991,392 | A | 11/1999 | Miloslavsky |
| 5,996,013 | A | 11/1999 | Delp et al. |
| 5,999,963 | A | 12/1999 | Bruno et al. |
| 6,000,832 | A | 12/1999 | Franklin et al. |
| 6,011,844 | A | 1/2000 | Uppaluru et al. |
| 6,014,437 | A | 1/2000 | Acker et al. |
| 6,031,896 | A | 2/2000 | Gardell et al. |
| 6,038,293 | A | 3/2000 | McNerney et al. |
| 6,038,296 | A | 3/2000 | Brunson et al. |
| 6,044,144 | A | 3/2000 | Becker et al. |
| 6,044,205 | A | 3/2000 | Reed et al. |
| 6,044,355 | A | 3/2000 | Crockett et al. |
| 6,049,547 | A | 4/2000 | Fisher et al. |
| 6,049,779 | A | 4/2000 | Berkson |
| 6,052,723 | A | 4/2000 | Ginn |
| 6,055,308 | A | 4/2000 | Miloslavsky et al. |
| 6,064,730 | A | 5/2000 | Ginsberg |
| 6,064,731 | A | 5/2000 | Flockhart et al. |
| 6,084,954 | A | 7/2000 | Harless et al. |
| 6,088,411 | A | 7/2000 | Powierski et al. |
| 6,088,441 | A | 7/2000 | Flockhart et al. |
| 6,108,670 | A | 8/2000 | Weida et al. |
| 6,115,462 | A | 9/2000 | Servi et al. |
| 6,128,304 | A | 10/2000 | Gardell et al. |
| 6,151,571 | A | 11/2000 | Pertrushin |
| 6,154,769 | A | 11/2000 | Cherkasova et al. |
| 6,163,607 | A | 12/2000 | Bogart et al. |
| 6,173,053 | B1 | 1/2001 | Bogart et al. |
| 6,175,564 | B1 | 1/2001 | Miloslavsky et al. |
| 6,178,441 | B1 | 1/2001 | Elnozahy |
| 6,185,292 | B1 | 2/2001 | Miloslavsky |
| 6,185,603 | B1 | 2/2001 | Henderson et al. |
| 6,192,122 | B1 | 2/2001 | Flockhart et al. |
| 6,215,865 | B1 | 4/2001 | McCalmont |
| 6,226,377 | B1 | 5/2001 | Donaghue, Jr. |
| 6,229,819 | B1 | 5/2001 | Darland et al. |
| 6,230,183 | B1 | 5/2001 | Yocom et al. |
| 6,233,333 | B1 | 5/2001 | Dezonmo |
| 6,240,417 | B1 | 5/2001 | Eastwick et al. |
| 6,259,969 | B1 | 7/2001 | Tackett et al. |
| 6,263,359 | B1 | 7/2001 | Fong et al. |
| 6,272,544 | B1 | 8/2001 | Mullen |
| 6,275,806 | B1 | 8/2001 | Pertrushin |
| 6,275,812 | B1 | 8/2001 | Haq et al. |
| 6,275,991 | B1 | 8/2001 | Erlin |
| 6,278,777 | B1 * | 8/2001 | Morley et al. ............ 379/265.02 |
| 6,292,550 | B1 | 9/2001 | Burritt |
| 6,295,353 | B1 | 9/2001 | Flockhart et al. |
| 6,298,062 | B1 | 10/2001 | Gardell et al. |
| 6,307,931 | B1 | 10/2001 | Vaudreuil |
| 6,324,282 | B1 | 11/2001 | McIllwaine et al. |
| 6,332,081 | B1 | 12/2001 | Do |
| 6,339,754 | B1 | 1/2002 | Flanagan et al. |
| 6,353,810 | B1 | 3/2002 | Petrushin |
| 6,356,632 | B1 | 3/2002 | Foster et al. |
| 6,360,222 | B1 | 3/2002 | Quinn |
| 6,366,666 | B2 | 4/2002 | Bengtson et al. |
| 6,366,668 | B1 | 4/2002 | Borst et al. |

(56) References Cited

U.S. PATENT DOCUMENTS

| | | | |
|---|---|---|---|
| 6,389,028 | B1 | 5/2002 | Bondarenko et al. |
| 6,389,132 | B1 | 5/2002 | Price |
| 6,389,400 | B1 | 5/2002 | Bushey et al. |
| 6,408,066 | B1 | 6/2002 | Andruska et al. |
| 6,408,277 | B1 | 6/2002 | Nelken |
| 6,411,682 | B1 | 6/2002 | Fuller et al. |
| 6,424,709 | B1 | 7/2002 | Doyle et al. |
| 6,426,950 | B1 | 7/2002 | Mistry |
| 6,427,137 | B2 | 7/2002 | Petrushin |
| 6,430,282 | B1 | 8/2002 | Bannister et al. |
| 6,434,230 | B1 | 8/2002 | Gabriel |
| 6,446,092 | B1 | 9/2002 | Sutter |
| 6,449,356 | B1 | 9/2002 | Dezonno |
| 6,449,358 | B1 | 9/2002 | Anisimov et al. |
| 6,449,646 | B1 | 9/2002 | Sikora et al. |
| 6,453,038 | B1 | 9/2002 | McFarlane et al. |
| 6,459,787 | B2 | 10/2002 | McIllwaine |
| 6,463,148 | B1 | 10/2002 | Brady |
| 6,463,346 | B1 | 10/2002 | Flockhart et al. |
| 6,463,415 | B2 | 10/2002 | St. John |
| 6,463,471 | B1 | 10/2002 | Dreke et al. |
| 6,480,826 | B2 | 11/2002 | Pertrushin |
| 6,490,350 | B2 | 12/2002 | McDuff et al. |
| 6,535,600 | B1 | 3/2003 | Fisher et al. |
| 6,535,601 | B1 | 3/2003 | Flockhart et al. |
| 6,553,114 | B1 | 4/2003 | Fisher et al. |
| 6,556,974 | B1 | 4/2003 | D'Alessandro |
| 6,560,330 | B2 | 5/2003 | Gabriel |
| 6,560,649 | B1 | 5/2003 | Mullen et al. |
| 6,560,707 | B2 | 5/2003 | Curtis et al. |
| 6,563,920 | B1 | 5/2003 | Flockhart et al. |
| 6,563,921 | B1 | 5/2003 | Williams et al. |
| 6,571,285 | B1 | 5/2003 | Groath et al. |
| 6,574,599 | B1 | 6/2003 | Lim et al. |
| 6,574,605 | B1 | 6/2003 | Sanders et al. |
| 6,597,685 | B2 | 7/2003 | Miloslavsky et al. |
| 6,603,854 | B1 | 8/2003 | Judkins et al. |
| 6,604,084 | B1 | 8/2003 | Powers et al. |
| 6,614,903 | B1 | 9/2003 | Flockhart et al. |
| 6,650,748 | B1 | 11/2003 | Edwards et al. |
| 6,662,188 | B1 | 12/2003 | Rasmussen et al. |
| 6,668,167 | B2 | 12/2003 | McDowell et al. |
| 6,675,168 | B2 | 1/2004 | Shapiro et al. |
| 6,684,192 | B2 | 1/2004 | Honarvar et al. |
| 6,697,457 | B2 | 2/2004 | Petrushin |
| 6,700,967 | B2 | 3/2004 | Kleinoder et al. |
| 6,700,971 | B1 * | 3/2004 | Cohen et al. ............. 379/265.06 |
| 6,704,409 | B1 | 3/2004 | Dilip et al. |
| 6,707,903 | B2 | 3/2004 | Burok et al. |
| 6,711,253 | B1 * | 3/2004 | Prabhaker ................ 379/265.01 |
| 6,724,885 | B1 | 4/2004 | Deutsch et al. |
| 6,735,299 | B2 | 5/2004 | Krimstock et al. |
| 6,735,593 | B1 | 5/2004 | Williams |
| 6,738,462 | B1 | 5/2004 | Brunson |
| 6,744,877 | B1 | 6/2004 | Edwards |
| 6,754,333 | B1 | 6/2004 | Flockhart et al. |
| 6,757,362 | B1 | 6/2004 | Cooper et al. |
| 6,766,013 | B2 | 7/2004 | Flockhart et al. |
| 6,766,014 | B2 | 7/2004 | Flockhart et al. |
| 6,766,326 | B1 | 7/2004 | Cena |
| 6,775,377 | B2 | 8/2004 | McIllwaine et al. |
| 6,785,666 | B1 | 8/2004 | Nareddy et al. |
| 6,822,945 | B2 | 11/2004 | Petrovykh |
| 6,829,348 | B1 | 12/2004 | Schroeder et al. |
| 6,839,735 | B2 | 1/2005 | Wong et al. |
| 6,842,503 | B1 | 1/2005 | Wildfeuer |
| 6,847,973 | B2 | 1/2005 | Griffin et al. |
| 6,898,190 | B2 | 5/2005 | Shtivelman et al. |
| 6,915,305 | B2 | 7/2005 | Subramanian et al. |
| 6,947,543 | B2 | 9/2005 | Alvarado et al. |
| 6,947,988 | B1 | 9/2005 | Saleh |
| 6,963,826 | B2 | 11/2005 | Hanaman et al. |
| 6,968,052 | B2 | 11/2005 | Wullert, II |
| 6,981,061 | B1 | 12/2005 | Sakakura |
| 6,985,901 | B1 | 1/2006 | Sachse et al. |
| 6,988,126 | B2 | 1/2006 | Wilcock et al. |
| 7,010,542 | B2 | 3/2006 | Trappen et al. |
| 7,020,254 | B2 | 3/2006 | Phillips |
| 7,035,808 | B1 | 4/2006 | Ford |
| 7,035,927 | B2 | 4/2006 | Flockhart et al. |
| 7,039,176 | B2 | 5/2006 | Borodow et al. |
| 7,054,434 | B2 | 5/2006 | Rodenbusch et al. |
| 7,062,031 | B2 | 6/2006 | Becerra et al. |
| 7,076,051 | B2 | 7/2006 | Brown et al. |
| 7,100,200 | B2 | 8/2006 | Pope et al. |
| 7,103,562 | B2 * | 9/2006 | Kosiba et al. ............. 379/265.06 |
| 7,110,525 | B1 | 9/2006 | Heller et al. |
| 7,117,193 | B1 | 10/2006 | Basko et al. |
| 7,127,058 | B2 | 10/2006 | O'Connor et al. |
| 7,136,873 | B2 | 11/2006 | Smith et al. |
| 7,149,733 | B2 | 12/2006 | Lin et al. |
| 7,155,612 | B2 | 12/2006 | Licis |
| 7,158,628 | B2 | 1/2007 | McConnell et al. |
| 7,158,909 | B2 | 1/2007 | Tarpo et al. |
| 7,162,469 | B2 | 1/2007 | Anonsen et al. |
| 7,165,075 | B2 | 1/2007 | Harter et al. |
| 7,170,976 | B1 | 1/2007 | Keagy |
| 7,170,992 | B2 | 1/2007 | Knott et al. |
| 7,177,401 | B2 | 2/2007 | Mundra et al. |
| 7,200,219 | B1 | 4/2007 | Edwards et al. |
| 7,203,655 | B2 | 4/2007 | Herbert et al. |
| 7,212,625 | B1 | 5/2007 | McKenna et al. |
| 7,215,744 | B2 | 5/2007 | Scherer |
| 7,246,371 | B2 | 7/2007 | Diacakis et al. |
| 7,257,513 | B2 | 8/2007 | Lilly |
| 7,257,597 | B1 | 8/2007 | Pryce et al. |
| 7,266,508 | B1 | 9/2007 | Owen et al. |
| 7,283,805 | B2 | 10/2007 | Agrawal |
| 7,295,669 | B1 | 11/2007 | Denton et al. |
| 7,299,259 | B2 | 11/2007 | Petrovykh |
| 7,324,954 | B2 | 1/2008 | Calderaro et al. |
| 7,340,408 | B1 | 3/2008 | Drew et al. |
| 7,373,341 | B2 | 5/2008 | Polo-Malouvier |
| 7,376,127 | B2 | 5/2008 | Hepworth et al. |
| 7,386,100 | B2 | 6/2008 | Michaelis |
| 7,392,402 | B2 | 6/2008 | Suzuki |
| 7,418,093 | B2 | 8/2008 | Knott et al. |
| 7,499,844 | B2 | 3/2009 | Whitman, Jr. |
| 7,545,761 | B1 | 6/2009 | Kalbag |
| 7,545,925 | B2 | 6/2009 | Williams |
| 7,885,209 | B1 | 2/2011 | Michaelis et al. |
| 2001/0011228 | A1 | 8/2001 | Shenkman |
| 2001/0034628 | A1 | 10/2001 | Eder |
| 2001/0056349 | A1 | 12/2001 | St. John |
| 2002/0002460 | A1 | 1/2002 | Pertrushin |
| 2002/0002464 | A1 | 1/2002 | Petrushin |
| 2002/0010587 | A1 | 1/2002 | Pertrushin |
| 2002/0012186 | A1 | 1/2002 | Nakamura et al. |
| 2002/0019829 | A1 | 2/2002 | Shapiro |
| 2002/0021307 | A1 | 2/2002 | Glenn et al. |
| 2002/0035605 | A1 | 3/2002 | McDowell et al. |
| 2002/0038422 | A1 | 3/2002 | Suwamoto et al. |
| 2002/0065894 | A1 | 5/2002 | Dalal et al. |
| 2002/0076010 | A1 | 6/2002 | Sahai |
| 2002/0085701 | A1 | 7/2002 | Parsons et al. |
| 2002/0087630 | A1 | 7/2002 | Wu |
| 2002/0112186 | A1 | 8/2002 | Ford et al. |
| 2002/0116336 | A1 | 8/2002 | Diacakis et al. |
| 2002/0116461 | A1 | 8/2002 | Diacakis et al. |
| 2002/0118816 | A1 | 8/2002 | Flockhart et al. |
| 2002/0123923 | A1 | 9/2002 | Manganaris et al. |
| 2002/0147730 | A1 | 10/2002 | Kohno |
| 2002/0181692 | A1 | 12/2002 | Flockhart et al. |
| 2002/0194002 | A1 | 12/2002 | Petrushin |
| 2002/0194096 | A1 | 12/2002 | Falcone et al. |
| 2003/0004704 | A1 | 1/2003 | Baron |
| 2003/0014491 | A1 | 1/2003 | Horvitz et al. |
| 2003/0028621 | A1 | 2/2003 | Furlong et al. |
| 2003/0048893 | A1 | 3/2003 | McIllwaine et al. |
| 2003/0073440 | A1 | 4/2003 | Mukherjee et al. |
| 2003/0093465 | A1 | 5/2003 | Banerjee et al. |
| 2003/0108186 | A1 | 6/2003 | Brown et al. |
| 2003/0144900 | A1 | 7/2003 | Whitmer |
| 2003/0144959 | A1 | 7/2003 | Makita |

(56) References Cited

U.S. PATENT DOCUMENTS

| | | | |
|---|---|---|---|
| 2003/0174830 A1 | 9/2003 | Boyer et al. | |
| 2003/0177017 A1 | 9/2003 | Boyer et al. | |
| 2003/0231757 A1 | 12/2003 | Harkreader et al. | |
| 2004/0008828 A1 | 1/2004 | Coles et al. | |
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0102940 A1 | 5/2004 | Lendermann et al. | |
| 2004/0103324 A1 | 5/2004 | Band | |
| 2004/0138944 A1 | 7/2004 | Whitacre et al. | |
| 2004/0162998 A1 | 8/2004 | Tuomi et al. | |
| 2004/0165717 A1 | 8/2004 | Mcllwaine et al. | |
| 2004/0193646 A1 | 9/2004 | Cuckson et al. | |
| 2004/0202308 A1* | 10/2004 | Baggenstoss et al. | ... 379/265.06 |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0240659 A1 | 12/2004 | Gagle et al. | |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0027612 A1 | 2/2005 | Walker et al. | |
| 2005/0044375 A1 | 2/2005 | Paatero et al. | |
| 2005/0049911 A1 | 3/2005 | Engelking et al. | |
| 2005/0065837 A1 | 3/2005 | Kosiba et al. | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0228707 A1 | 10/2005 | Hendrickson | |
| 2005/0261035 A1 | 11/2005 | Groskreutz et al. | |
| 2005/0283393 A1 | 12/2005 | White et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0026049 A1 | 2/2006 | Joseph et al. | |
| 2006/0056598 A1 | 3/2006 | Brandt et al. | |
| 2006/0058049 A1 | 3/2006 | McLaughlin et al. | |
| 2006/0100973 A1 | 5/2006 | McMaster et al. | |
| 2006/0135058 A1 | 6/2006 | Karabinis | |
| 2006/0167667 A1 | 7/2006 | Maturana et al. | |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth et al. | |
| 2006/0285648 A1 | 12/2006 | Wahl et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1* | 5/2007 | Barnett | ... 709/224 |
| 2007/0127643 A1 | 6/2007 | Keagy | |
| 2007/0156375 A1 | 7/2007 | Meier et al. | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |

FOREIGN PATENT DOCUMENTS

| | | |
|---|---|---|
| EP | 0501189 | 9/1992 |
| EP | 0576205 | 12/1993 |
| EP | 0 740 450 A2 | 10/1996 |
| EP | 0740450 | 10/1996 |
| EP | 0770967 | 5/1997 |
| EP | 0772335 | 5/1997 |
| EP | 0 829 996 A2 | 3/1998 |
| EP | 0829996 | 3/1998 |
| EP | 0 855 826 A2 | 7/1998 |
| EP | 0855826 | 7/1998 |
| EP | 0 866 407 A1 | 9/1998 |
| EP | 0863651 | 9/1998 |
| EP | 0866407 | 9/1998 |
| EP | 899673 | 3/1999 |
| EP | 998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

Microsoft R Access 97 for Windows R Application development guide, Ver. 8.0, Microsoft Corp., a first version, pp. 569-599.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Bischoff et al. "Data Ware House Building Method—practical advices telled by persons having experience and experts", Kyouritsu Shuppan Corp. May 30, 2000, first edition, pp. 197-216.

U.S. Appl. No. 11/536,456, Hackbarth.

U.S. Appl. No. 10/815,566, Kiefhaber.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages)

Aspect—"Performance Optimization," http://aspect.com/products/wfm/performanceopt.cfm?section=performanceopt, (Copyright 2005) (1page).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

(56) References Cited

OTHER PUBLICATIONS

Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc,, "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al,, "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
Definity Communications System Generic 3 Call Vectoring/Expert Agent Selection (EAS) Guide, At&T publication No. 555-230-520 (Issue 3, Nov. 1993).
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
Geotel Communications Corporation Web site printout entitled "Intelligent CallRouter" Optimizing the Interaction Between Customers and Answering Resources., 1998, 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Nice Systems—"Insight from Interactions," "Overwhelmed by the Amount of Data at your Contact Center?" http://www.nice.com/products/multimedia/analyzer.php, (Printed May 19, 2005) (2 pages).
Nice Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segId=0&parID=0&catID=-9191&rend_id . . . (Copyright 1999-2005) (1page).
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.

"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Kana—Contact Center Support", available at http://www.kana.com/solutions.php?tid=46, copyright 2006, 3 pages.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
"Applications, NPRI's Predictive Dialingyackage," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire(Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
"Vast™, Voicelink Application Software for Teleservicing®," System Manager User's Guide, Digital Systems 1994 pp. ii, vii-ix, 1-2, 2-41 through 2-77.
"When Talk Isn't Cheap," Sm@rt Reseller, v. 3, n. 13 (Apr. 3, 2000), p. 50.
U.S. Appl. No. 10/683,039, filed Oct. 10, 2003, Flockhart et al.
U.S. Appl. No. 10/861,193, filed Jun. 3, 2004, Kiefhaber.
U.S. Appl. No. 10/946,638, filed Sep. 20, 2004, Flockhart et al.
U.S. Appl. No. 11/087,290, filed Mar. 22, 2005, Michaelis.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/861,857, filed Sep. 26, 2007, Tendick et al.
"Still Leaving It to Fate?: Optimizing Workforce Management", Durr, William Jr., Nov. 2001.
G. Hellstrom et al., "RFC 2793—RTP Payload for Text Conversation," Network Working Group Request for Comments 2793 (May 2000), available at http://www.faqs.org/rfcs/rfc2793.html, 8 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
Kimball, et al., "Practical Techniques for Extracting, Cleaning, Conforming, and Delivering Data." The Data Warehouse ETL Toolkit. 2004. Ch. 5, pp. 170-174.
Snape, James, "Time Dimension and Time Zones." 2004. pp. 1-10. http://www.jamessnape.me.uk/blog/CommentView,gui,79e910a1-0150-4452-bda3-e98d.
Data Warehouse Designer—Divide and Conquer, Build Your Data Warehouse One Piece at a Time, Ralph Kimball, Oct. 30, 2002, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.

(56) References Cited

OTHER PUBLICATIONS

Data Warehouse Designer—TCO Starts with the End User, Ralph Kimball, May 13, 2003, http://www.intelligententerprise.com/030513/608warehouse1_1.jhtml?_requestid=598425, 3 pages.
Creating and Using Data Warehouse—Using Dimensional Modeling (Microsoft) downloaded May 18, 2005 http://msdn.microsoft.com/library/en-us/createdw/createdw_39z.asp?frame=true 1 page.
Creating and Using Data Warehouse Dimension Tables (Microsoft) copyright 2005, http://msdn.microsoft.com/library/en-us/createdw/createdw_10kz.asp?frame=true, 3 pages.
DMReview—Business Dimensional Modeling: The Logical Next Step: Translating the BDM, Laura Reeves, published May 2004, 4 pages.
Multi-Dimensional Modeling with BW ASAP for BW Accelerator Business Information Warehouse, copyright 2000, 71 pages.
ComputerWorld, ETL, M. Songini, at http://wvvw.computerworld.com/databasetopics/businessintelligence/datawarehouse/story/ . . . , copyright 2005, 5 pages.
Kimball, et al., "The Complete Guide to Dimensional Modeling." The Data Warehouse Toolkit. 2nd Edition, 2002. Ch. 11, pp. 240-241.
Fundamentals of Data Warehousing—Unit 3—Dimensional Modeling, Fundamentals of Data Warehousing, copyright 2005—Evolve Computer Solutions, 55 pages.
The Importance of Data Modeling as a Foundation for Business Insight, Larissa Moss and Steve Hoberman, copyright 2004, 38 pages.
CS 345: Topics in Data Warehousing, Oct. 5, 2004, 36 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 page.
Data Warehouse Designer Fact Tables and Dimension, Jan. 1, 2003, http://www.inteeigententerprise.com/030101/602warehouse1_1.jhtml, Ralph Kimball, 3 page.
Glossary—Curlingstone Publishing, http://www.curlingstone.com/7002/7002glossary.html, downloaded May 24, 2005, 11 pages.
Data Warehouse—Surrogate Keys, Keep Control Over Record Identifiers by Generating New Keys for the Data Warehouse, Ralph Kimball, May 1998, 4 pages.
Data Warehouse Designer—An Engineer's View—Its' Worthwhile to Remind Ourselves Why We Build Data Warehouses the Way We Do, Ralph Kimball, Jul. 26, 2002, 3 pages.
Data Warehouse Designer—Design Constraints and Unavoidable Realities, No design Problem in School was This Hard, Ralph Kimball, Sep. 3, 2002, 3 pages.
Data Warehouse Designer—Two Powerful Ideas, The Foundation for Modern Data Warehousing, Ralph Kimball, Sep. 17, 2002, 3 pages.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Bill Michael, "The Politics of Naming" www.cConvergence.com (Jul. 2001) pp. 31-35.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
E. Veerman, "Designing a Dimensional Model", date unknown, 38 pages.
G. Wiederhold, "Mediation to Deal with Heterogeneous Data Sources", Stanford University, Jan. 1999, 19 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
J. Cahoon, "Fast Development of a Data Warehouse Using MOF, CWM and Code Generation", CubeModel, May 22, 2006, 32 pages.
J.E. Bentley, "Metadata: Everyone Talks About It, But What Is It?", First Union National Bank, date unknown, 5 pages.
L. Cabibbo et al., "An Architecture for Data Warehousing Supporting Data Independence and Interoperability", International Journal of Cooperative Information Systems, Nov. 2004, 41 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
Andy Zmolek; "Simple and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Background of the Invention for the above-captioned application (previously provided).
U.S. Appl. No. 12/193,542, filed Aug. 18, 2008, Olson.
U.S. Appl. No. 12/242,916, filed Oct. 1, 2008, Kiefhaber et al.
Dillion, "Renaming fields and tracing dependencies", available at http://allenbrowne.com/ser-41.html, Nov. 2003, updated May 2006, 1 page.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Sarda, "Temporal Issues in Data Warehouse Systems", 1999, Database Applications in Non-Traditional Environments (DANTE'99), S. 27, DOI: 10.1109/DANTE.1999.844938.
Thayer Watkins, "Cost Benefit Analysis", 1999, San Jose State University Economics Department, Web Archive http://web.arch ive.org/web/19990225143131/http://www.sjsu.edu/faculty/watkins/cba.htm.
"Learn the structure of an Access database", available at http://office.microsoft.com/en-us/access/HA012139541033.aspx, site updated Nov. 13, 2007, pp. 1-4.
U.S. Appl. No. 11/242,687, filed Oct. 3, 2005, Krimstock et al.
Microsoft Office Animated Help Tool, date unknown, 1 page.
Akitsu, "An Introduction of Run Time Library for C Program, the fourth round," C Magazine, Jul. 1, 1990, vol. 2(7), pp. 78-83.
Emura, "Windows API Utilization Guide, Points for Knowledges and Technologies," C Magazine, Oct. 1, 2005, vol. 17(10), pp. 147-150.
Examiner's Office Letter (including translation) for Japanese Patent Application No. 2007-043414, mailed Jul. 7, 2010.

(56) References Cited

OTHER PUBLICATIONS

Google Docs "IP Softphone for Windows Mobile 5" printed on Sep. 15, 2009 from http://docs.google.com/gview?a=v&q=cache: 92VrteFXqm8J:support.avaya.com/css/P8/document s/100021136+Avaya+telecom . . . , 1 page.
Overview of Avaya IP Softphone printed on Sep. 15, 2009 from http://support.avaya.com/elmodocs2/ip_softphone/Overview_IP_ Softphone_R6.htm, 2 pages.
U.S. Appl. No. 12/569,581, filed Sep. 29, 2009, Michaelis.
Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . , 1 page.
Product Description of "Avaya one-X Agent," printed on Sep. 15, 2009 from http://www.avaya.com/usa/product/avaya-one-x-agent, 1 page.
Product Overview of "IP Softphone" printed on Sep. 15, 2009 from http://www.nacr.com/Products.aspx?id=236, 3 pages.
Venkatesan et al., "A Customer Lifetime Value Framework for Customer Selection and Resource Allocation Strategy," Journal of Marketing, Oct. 2004, vol. 68, pp. 106-125.
U.S. Appl. No. 11/956,779, filed Dec. 14, 2007, Burritt et al.
"Siebel Contact Center and Service Analytics," Aug. 5, 2005, 2 paes, retrieved from http://web.archive.org/web/20050804082454/http://www.siebel.com/call-center-software/contactcenter-analytics.shtm.
US 6,537,685, 03/2003, Fisher et al. (withdrawn).
U.S. Appl. No. 10/815,556, filed Mar. 31, 2004, Kiefhaber.
U.S. Appl. No. 10/815,534, filed Mar. 31, 2004, Kiefhaber.
U.S. Appl. No. 10/099,144, filed Mar. 15, 2002, Boyer et al.
U.S. Appl. No. 10/089,824, filed Mar. 15, 2002, Boyer et al.
Nice Systems— "Multimedia Interaction Products," "Insight from Interactions," http://www.nice,com/products/multimedia/contact centers,php (Printed May 19, 2005) (3 pages).
U.S. Appl. No. 10/815,584, filed Mar. 31, 2004, Kiefhaber.
U.S. Appl. No. 10/174,278, filed Jun. 17, 2002, Harkreader et al.
U.S. Appl. No. 09/416,737, filed Oct. 13, 1999, Acui et al.
Nice Systems—"Insight from Interactions," "Overwhelmed by the Amount of Data at your Contact Center?" http://www.nice.com/oroducts/multimedia/analyzer.php, (Printed May 19, 2005) (3 pages).
Aspect—"Performance Optimization," http://aspect.com/products/wfm/performanceoot.cfm?sectionzperformanceopt, (Copyright 2005) (1page).
Nortel—"Centrex Internet Enabled Call Centers," http://www.productsmortel.com/go/product_assoc.jsp?segld=0&parID=0& catID=-9191&rend_id . . . (Copyright 1999-2005) (1page).
Avaya—"Call Management System," Product Features, http://www.avaya.comfgcm/master-usa/enus/products/offers/call_management_system.htm (Copyright 2005) (3 pages).
Avaya—"Call Management System," Product Overview, http://www.avaya.com/gcm/master-usa/enustproducts/offers/call_management_system.htm (Copyright 2005) (2 pages).
Avaya—"Call Management System," Product Description, http://www.avaya.com/gcm/master-usa/enus/products/offers/call_management_system.htm (Copyright 2005) (2 pages).
Avaya—"Call Management System," Product Technical, http://www.avaya.com/gcm/master-usa/enus/products/offers/call_management_system.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usaten-us/products/offers/bcmrs_desktop.htm (Copyright 2005) (2 pages).
Avaya—"Basic Call Management System Reporting Desktop," Product Description, hffp://wvvw.avaya.com/gcm/master-usa/en-us/products/offers/bcmrs_desktop.htm (Copyright 2005) (2 pages).
Avaya—"Basic Call Management System Reporting Desktop," Product Technical, http://www,avaya,com/gcm/master-usa/en-us/products/offers/bcmrs_desktop.htm (Copyright 2005) (2 pages).
Cherry, "Anger Management," IEEE Spectrum (Apr. 2005) (1 page).
Presentation by Victor Zue, the MIT Oxygen Project, MIT Laboratory for Computer Science (Apr. 25-26, 2000) (9 pages).
MIT Project Oxygen, Pervasive, Human-Centered Computing (MIT Laboratory for Computer Science) (Jun. 2000) (18 pages).
L.F. Lamel and J.L. Gauvaln, *Language Identification Using Phone-Based Acoustic Likelihoods*, ICASSP-94 (4 pages) Apr. 1994.
John H.L., Hansen and Levent M. Arsian, *Foreign Accent Classification Using Source Generator Based Prosodic Features*, Robust Speech Processing Laboratory, Duke University Department of Electrical Engineering, Durham, NC (4 pages) May 1995.
Levent M. ArsIan and John H.L. Hansen, *Language Accent Classification in American English*, Robust Speech Processing Laboratory, Duke Universiry Department of Electrical Engineering, Durham, NC Technical Report RSPL-96-7, revised Jan. 1, 1996 (32 pages).
Levent M. Arsian, *Foreign Accent Classification in American English*, Department of Electrical Computer Engineering, Duke University, Dissertation (Copyright 1996) (218 pages).
Doo-Hyun Kim et al., "Collaborative Multimedia Middleware Architecture and Advanced Internet Call Center," Proceedings International Conference on Information Networking (Jan. 31, 2001), pp. 246-50 (3 pages).
E. Noth et al., "Research Issues for the Next Generation Spoken," University of Erlangen-Nuremberg, Bavarian Research Center for Knowledge-Based Systems, at http://www5.informatik.uni-erlangen.de/literature/psdir/1999/Noeth99.Rif.ps.gz. (8 pages).
No Author, "When Talk Isn't Cheap," Sm@rt Reseller, v. 3, n. 13 (Apr. 3, 2000), p. 50 (1 page).
No Author, "eGaln's Commerce 2060 Platform Sets New Standard for eCommerce Customer Communications," Business Wire (Nov. 15, 1999) (3 pages).
Aspect—"Call Center Reports," http://aspect.com/products/analysis/ccreporting.cfm, (Copyright 2005) (2 pages).
Aspect—"Analysis and Reporting," http://aspect.com/products/analvsis/index.cfm, (Copyright 2005) (1 page).
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Multi Channel Product Authorization," (PA) Version 5.0, (Nov. 2003) (6 pages).
Avaya—"Avaya Call Management System" (Copyright 2003) (3 pages).
Avaya—"Avaya Basic Call Management System Reporting Desktop" (Copyright 2002) (4 pages).
AT&T—"Definity Communications System Generic 3 Call Vectoring/Expert Agent Selection (EAS) Guide" (Copyright 1993) (458 pages).

\* cited by examiner

| Interval | % within Service Level | Arrivals | Avg Pos Staffed | Avg Pos Work | Occupancy |
|---|---|---|---|---|---|
| 11:15 | 79 | 111 | 40 | 27.5 | 80 |
| 11:30 | 78 | 92 | 40 | 26 | 75 |
| 11:45 | 79 | 87 | 40 | 26 | 75 |
| 12:00 | 79 | 89 | 40 | 20 | 72 |
| 12:15 | 78 | 94 | 40 | 24 | 73 |
| 12:30 | 69 | 95 | 40 | 26 | 68 |
| 12:45 | 75 | 101 | 40 | 26.5 | 74 |

| Interval | % Preview Dur | % Active Dur | % Wrap-up Dur | % Idle Dur | % Initiate Dur | % Held Dur |
|---|---|---|---|---|---|---|
| 11:45 | | 65 | 10 | 15 | | 10 |
| 12:00 | | 70 | 15 | 5 | | 10 |

| Interval | 11:45 | 12:00 |
|---|---|---|
| % Womens | 50 | 55 |
| % Mens | 10 | 10 |
| % Shoes | 20 | 30 |
| % Outerwear | 20 | 5 | ns # CONTACT CENTER SERVICE MONITORING AND CORRECTING

FIELD

The present invention is directed generally to contact center administration and specifically to monitoring and correcting contact center performance.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the agent the highest-priority oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. Contact center efficiency is generally measured in two ways.

Service level is one measurement of contact center efficiency and is generally determined by dividing the number of contacts accepted within a selected period of time by the number of contacts arriving in a contact center over the same period of time plus the number that were not accepted, but completed in some other way (e.g., abandoned, given busy, canceled, flowed out, etc.). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In this pursuit of contact center optimization, a contact center administrator will often make administrative changes trying to improve the level of service and/or match rate. The administrative changes may include changing staffing levels, changing agent queue assignments, or changing contact routing vectors. Usually the contact center administrator makes these changes with a goal of optimizing performance locally (i.e., within a certain group or within a certain business unit). Unfortunately, it is very difficult for the contact center administrator to predict the effects of such a change globally. For example, if two additional agents were added to a particular queue by changing their skill levels, they may no longer be able to service two other queues. Thus, the performance of one queue group will be improved at the expense of two other queue groups. It would be convenient to reverse such a change that has a negative impact on the overall contact center performance.

A problem is that identifying what system change affected performance is not an easy task. Additionally, there are currently few or no provisions for reversing such a change, even if it were identified. Rather, it is up to the contact center administrator to identify what change had a negative impact on contact center performance and reverse the change. However, in a complex contact center it may be nearly impossible for the administrator to determine the change that resulted in a decrease of contact center performance. If the administrator is unable to identify the degrading change but attempts to remedy the situation by changing some other contact center parameter the problem may be compounded.

SUMMARY

These and other needs are addressed by the various embodiments and configurations of the present invention. The present invention is directed generally to the identification, analysis, and/or tracking of administrative or configuration changes in a contact center.

In one embodiment, a method is provided for managing a contact center that includes the steps of:
(a) detecting a predetermined level of change in a primary contact center performance parameter;
(b) in response, identifying a change in a secondary contact center parameter that occurred no more than a selected time period before the detected change, where the primary and secondary parameters are different;
(c) performing at least one of the following substeps:
(c1) notifying a contact center administrator of the identified change in the secondary contact center parameter as a possible cause of the detected change; and
(c2) automatically reversing the identified change in the secondary contact center parameter.

Often contact center parameter changes are made in an attempt to increase performance locally (i.e., within a particular contact center queue). However, due to the complex nature of contact centers, an increase of performance locally may actually result in a degradation of performance globally (i.e., across multiple queues).

The types of performance changes that are generally detected include a decrease in service level and a decrease in match rate. Upon the detection of such a decrease in the service level and/or match rate or any other primary performance parameter change (i.e., a measurement parameter), a root cause for the decrease is determined. The root cause for the decrease in performance can be determined by examining secondary contact center parameters (i.e., a controlling parameter) and determining whether one or more of those parameter such as contact center traffic, staffing, or staff utilization has changed. Additionally, staff behavior can be analyzed as a possible root cause. Moreover, changes in other secondary contact center parameters including system administration parameters like queue assignments and/or vector assignments can be analyzed to determine if they were a contributing factor to the decrease in performance. If the determined root cause includes a change to a queue assignment and/or vector assignment, then reasons for the queue assignment and/or vector assignment are determined. If the reason for the queue assignment and/or vector assignment change was to improve service, then the parameters corresponding to the queue assignment and/or vector assignment change can be automatically reversed using type 2 data, in one embodiment.

As can be appreciated, incoming and outgoing contact routing allocation among contact queues is understood to include queue assignment, vector configuration parameters, and other types of work item routing changes. Additionally, an agent queue assignment as used herein is understood to include agent skill sets, agent skill splits, and any other type of association between agents, agent queues, and skills.

In another embodiment, a system administrator may be notified of the root cause for the decline in system performance and may further be instructed to reverse the change. If the reason for the change was not to improve service levels then the queue assignment and/or vector assignment change should not be reversed without further investigation of the reasons for the change. For example, if queue assignments and/or vector assignments were changed to comply with certain laws or business policies, then the change should not be reversed. Rather, other possible remedies for the decline in performance should be explored like changing staffing, adjusting the work flow management (WFM) schedule, and other contact center parameters (e.g., failure of automated resources creating increased traffic to the contact center).

In one embodiment, the notification to the system administrator may be in the form of a performance report that, at its highest level, outlines and describes the decrease in performance. The report may further include one set of reports for a measured decrease in service level and another set of reports for a measured decrease in match rate. The system administrator can drill down through each of the sets of reports to determine possible root causes for the decrease in system performance. Additionally, the reports may suggest causes that have a higher probability of being the root cause based on certain aspects of the decline in performance. The reports may further provide suggestions for correcting the problem. The suggestions may include reversing certain parameter changes that have been implemented in the contact center and implementing other parameter changes that could improve performance. These suggestions, in one embodiment, are based upon historical data related to changes that resulted in an increase in contact center performance.

As can be appreciated by one of skill in the art, a contact is understood herein to include voice calls, emails, chat, video calls, fax, and combinations thereof. Accordingly, a contact center may be equipped to handle any one or a number of the above-noted contact types.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to any particular type of communication system switch or configuration of system elements. Those skilled in the art will recognize that the disclosed techniques may be used in any communication application in which it is desirable to provide improved contact processing.

Figure 1:
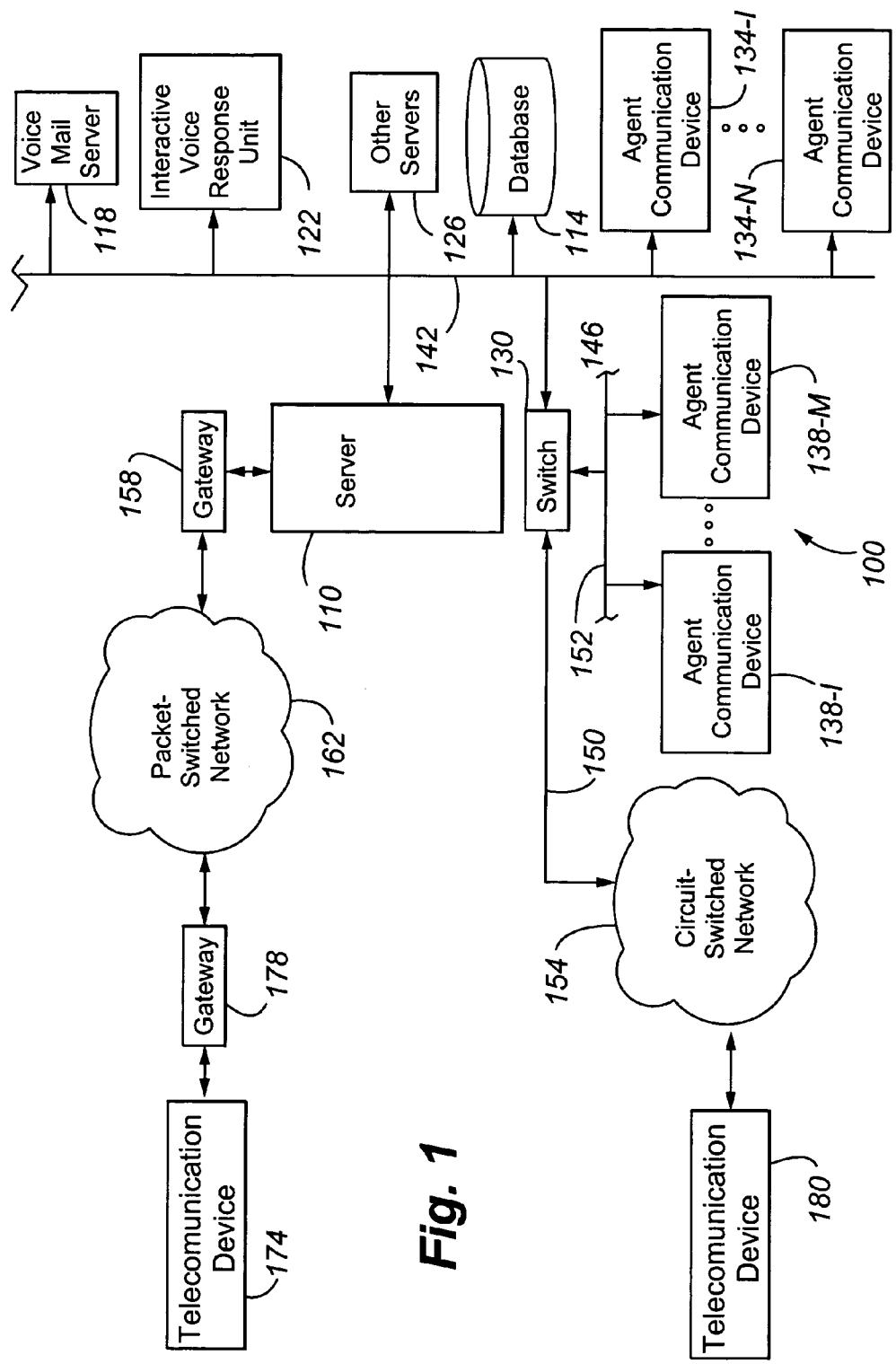
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
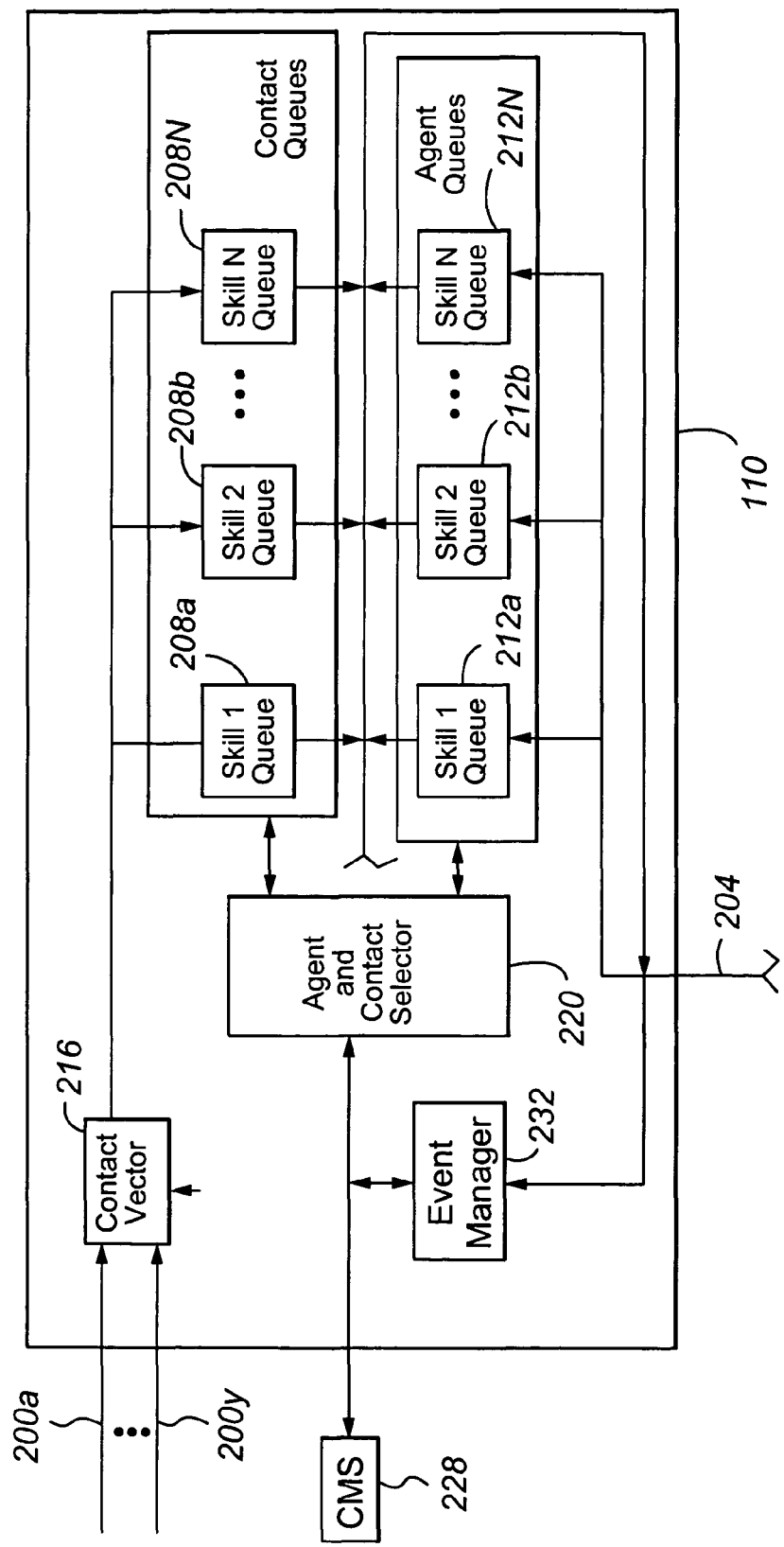
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports. CMS 228 and any other reporting system, such as a Basic Call Management System™, Operational Analyst™ or Customer Call Routing or CCR™ will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's queues are prioritized according to his or her level of expertise in that queue, and either agents are enqueued in individual ones of agent queues 212a-n in their order of expertise level or are enqueued in different ones of a plurality of agent queues 212a-n that correspond to a queue and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

According to at least one embodiment of the present invention, an event manager 232 is provided. The event manager 232 is stored either in the main memory or in a peripheral memory (e.g., disk, CD ROM, etc.) or some other computer-readable medium of the center 100. The event manager 232 identifies and analyzes specific occurrences of changes in contact center performance. Specifically, the event manager 232 monitors service level of the agents in the contact center and match rates of the agent and contact selector 220.

Service level is generally user-specified and provides an indication of how efficiently incoming contacts are being answered by agents in the agent queues 212. In one embodiment, service level is defined as the total number of contacts accepted (i.e., answered) by agents in the agent queue 212 divided by the total number of contacts entering the contact queue 208 over the same period of time.

Match rate is another indicator of contact center performance and usually identifies how well contacts are being connected with agent's having the necessary skill set to fulfill the requests represented by the contact. As noted above, some agents in a particular agent queue 212 may have a primary skill level for that queue whereas other agents may have a secondary skill level for the same queue. Additionally, one agent may have a primary skill level in the first queue 212a and a secondary skill level in the second queue 212b. Based on availabilities of agents in the agent queues 212 and the number of contacts waiting in the contact queue 208, the agent and contact selector 220 determines which agent should be assigned to which contact. It is a goal of the agent and contact selector 220 to assign contacts in the first customer queue 208a with primary skill level agents in the first agent queue 212a. Likewise, the agent and contact selector 220 would like to assign contacts in the second customer queue 208b with primary skill level agents in the second agent queue 212b. If the agent and contact selector 220 could realize such assignments, a substantially perfect match rate would be achieved. However, it is often the case that the number of contacts waiting in the contact queues 208 exceeds the number of agents waiting in the agent queues 212. For this reason, and due to other assignment parameters like required answering time, the agent and contact selector 220 is sometimes forced to assign contacts to secondary or backup skill level agents. Since match rate is generally determined as the number of contacts connected to primary skill level agents divided by the total number of contacts assigned to agents over a predetermined amount of time, if the agent and contact selector 220 is forced to assign contacts to less than primary skill level agents, the match rate performance indicator decreases.

The results of service level and match rate are actively monitored by the event manager 232 and in the event that a change in performance occurs, the event manager 232 logs the change and attempts to determine why the change occurred. If the change was an increase in performance, then the event manager 232 determines what type of change was made and further determines what the system parameters (e.g., queue and/or vector assignment) of the agent and contact selector 220 were prior to the change. Then the event manager 232 can store data related to the change in a positive system change log file.

If the change was a decrease in performance, then the event manager 232 communicates with the CMS 228 and agent and contact selector 220 to determine what the root cause of the performance change was and possibly reverse any change that was associated with the root cause. The event manager 232 can control the queue and/or vector assignment parameters directly through the agent and contact selector 220, which allows for automatic adjustment and maintenance of the contact center if negative changes are detected.

The event manager 232 is further operable to monitor system performance and maintain historical data related to the system performance. Additionally, the event manager 232 can monitor agent and contact selector parameter settings and other contact center parameters to supplement reports related to system performance.

Figure 3:
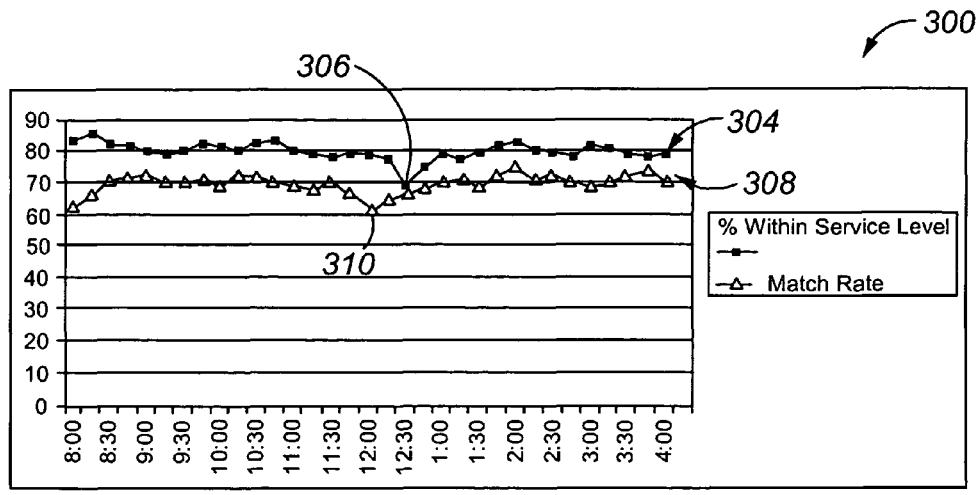
FIG. 3 is a queue service level and match rate trend report graph in accordance with embodiments of the present invention.

Referring now to FIG. 3 a queue service level and match rate trend report graph 300 generated by the event manager 232 will be described in accordance with at least some embodiments of the present invention. The queue service level and match rate graph 300 generally comprises historical service level measurements 304 and historical match rate measurements 308. The historical data may be periodically or continuously updated to reflect changes in performance. The report may be displayed to a system administrator in real-time such that the system administrator can be alerted to any sudden changes in performance. In an alternative embodiment, the queue service level and match rate graph 300 is displayed to a system administrator only when a substantial change in performance is detected. As will be appreciated, what is a substantial change is determined by a comparison to a selected threshold. The magnitude of the threshold depends on the parameter under analysis. For example, the threshold for service level will generally differ from that for match rate. Additionally, for a selected parameter, the parameter threshold can vary by time of day and by work item type, customer class, and/or agent skill type or level.

One example of a substantial change can be seen in the relatively sudden decrease of service level performance 306. The service level 304 is expected to change throughout the day, but usually at a relative smooth rate. However, the sudden drop in service level performance 306 may be considered a substantial change in contact center performance.

Another example of a substantial change can be seen in the drop of match rate 310 that occurred around 12:00. This particular drop in match rate 310 may have been due to an increase of traffic entering the contact center or due to other parameter changes in the agent and contact selector 220.

Figure 4:
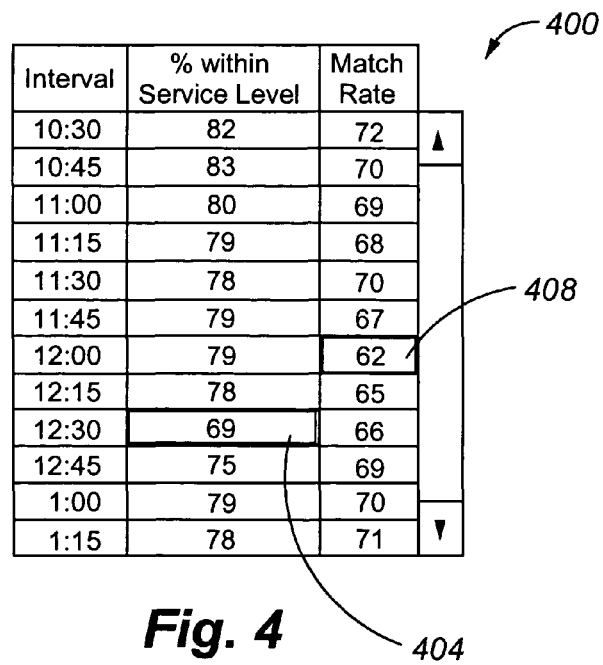
FIG. 4 is a queue service level and match rate trend report table in accordance with embodiments of the present invention.

As can be seen in FIG. 4, in one embodiment, when the service level 304 and/or match rate 308 changes drastically, the event manager 232 may generate a queue service level and match rate trend report table 400 to supplement the trend report graph 300. The queue service level and match rate trend report table 400 generally comprises a field of data for the service level measurements and a field of data for the match rate measurements. The sudden decrease in service level 404 is highlighted for ease of reference by the system administrator. Additionally, the sudden decrease in match rate 408 can be highlighted. As can be seen in FIGS. 3 and 4 the decrease in match rate 308 preceded the decrease in service level 304. This may be one indication that the decrease in match rate 308 resulted in the decrease in service level 304; however, such a determination should not be made until further analysis of the contact center parameters around the time of the decrease is completed.

When the system administrator is provided with the queue service level and match rate trend reports 300 and 400 the event manager 232 may further provide the system administrator with the ability to drill down into service level and match rate specific reports. These reports allow a system administrator to gain perspective on possible causes of the decrease in contact center performance.

Figures 5, 6:
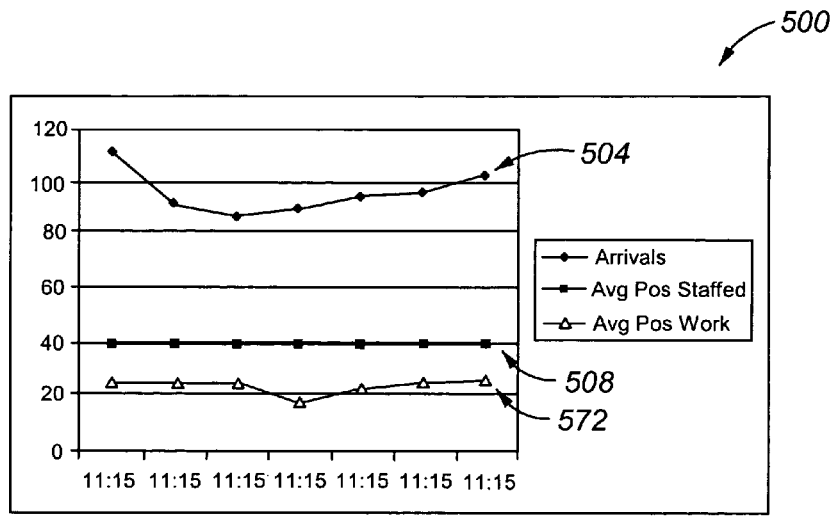
FIG. 5 is a queue service level cause trend report graph in accordance with embodiments of the present invention.
FIG. 6 is a queue service level cause trend report table in accordance with embodiments of the present invention.

As can be seen in FIG. 5, a queue service level cause trend report graph 500 may be provided to the system administrator as part of the drill down features associated with service level changes. The queue service level cause trend report graph 500 generally comprises a historical record of various contact center parameters around the time of the detected change in performance. Examples of the parameters that may be tracked include, for example, number of contact arrivals 504, average number of positions staffed 508, and average number of positions working 512. The number of contact arrivals 504 is generally tracked to determine if a change in traffic may have been the cause of the change in contact center performance. For example, a decrease in traffic (i.e., inbound and outbound contacts) may result in an increase in contact center performance. Conversely, an increase in traffic may result in a decrease in contact center performance.

The average number of positions staffed 508 is also tracked to help determine if a change in contact center performance was the result of a staffing change. A decrease in the number of positions staffed may explain a decrease in contact center performance as defined by service level and match rate. Alternatively, an increase in the number of staffed positions may explain an increase in contact center performance. As can be appreciated, a combinational change in arrivals and positions staffed may also explain a sudden change in contact center performance. For example, if the number of arrivals increased and the number of staffed positions decreased at around the same time, then contact center performance would likely suffer. On the other hand, a decrease in arrivals and an increase in staffed positions may result in an increase in contact center performance.

Of course, the number of staffed positions does not necessarily dictate the number of people working. For instance, some staffed positions may be on break while other staffed positions may be working on other queues. For this reason, the average number of positions working 512 is tracked. Tracking the average number of positions working allows a system administrator to identify if the problem was actually staffing.

Referring now to FIG. 6, a queue service level cause trend report table 600 will be described in accordance with embodiments of the present invention. The event manager 232 may provide the queue service level cause trend report table 600 to the system administrator along with the corresponding graph 500. Additional information is contained in the table 600 as compared to the graph 500. For example, the table 600 generally comprises an occupancy field 620 and a service level performance field 604 in addition to an arrivals field 608, an average positions staffed field 612, and an average positions working field 616. The service level performance field 604 provides an indication of approximately when the change in performance occurred. The values of the other fields can be analyzed for around the same time to determine what, if any, were the reasons for the change in performance. As can be seen in the example depicted in FIG. 6, the service level performance decreased around 12:30. During approximately the same time, the number of arrivals did not change dramatically nor did the number of positions staffed. Also, the number of positions working increased. However, the occupancy (i.e., the ratio of work time to staff time) decreased around the same time as the service level declined. This may provide a further indication that agent behavior may be a cause of the change in performance rather than a change to other system parameters.

In one embodiment, if traffic has changed, it may be compared to WFM forecasts to see if the traffic was predicted. If the WFM forecast was off, then it should be adjusted for the problem time period to ensure that performance does not drop in the same way due to another WFM misforecast.

As an example, if there was a sudden increase or spike in traffic, a system administrator could drill into where the traffic originated (e.g., by differentiating arrivals by area code or country code). If the increased traffic is from the same geographic area, then weather conditions or other regional events may have triggered the traffic. In some instances, such an increase of traffic may not be predictable. However, other instances of traffic may be predictable, for example if a certain town's baseball team is in the playoffs, traffic can be expected to increase. As another example, certain regional occurrences may lead to longer service times because people want to talk more.

In another embodiment, if the average positions staffed has changed, then the staffing can be compared to the WFM schedule. If the WFM schedule called for the change, then the WFM forecast parameters can be adjusted to staff more positions. If the WFM schedule does not have a change, then the system administrator can drill into an agent login/logout report or view a schedule adherence report to determine if the staffed positions were actually working as they were scheduled.

Figure 7:
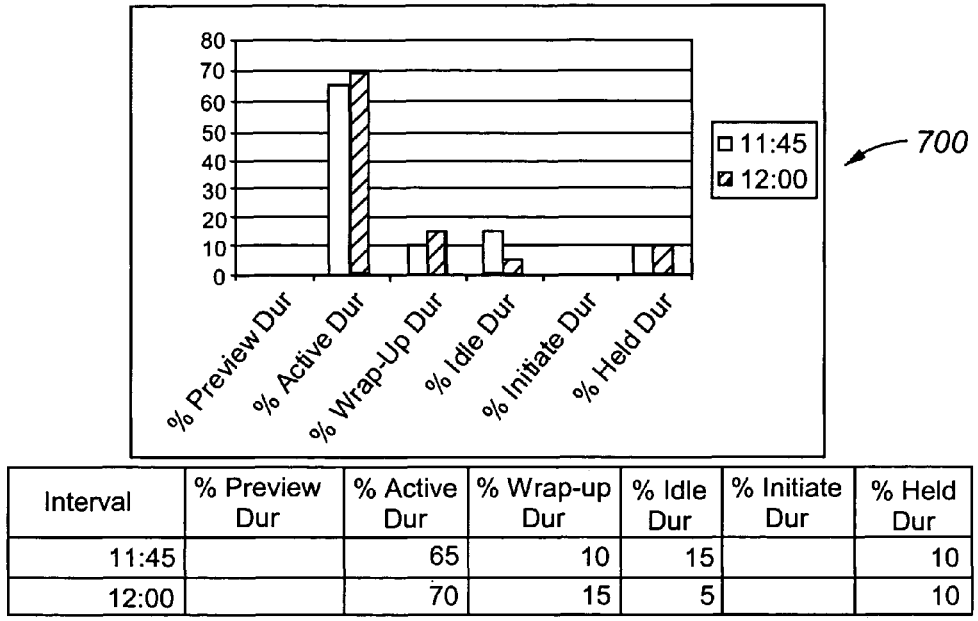
FIG. 7 is an agent utilization summary report graph and table in accordance with embodiments of the present invention.

In still another embodiment, following the example depicted where average positions working has changed, a system administrator can check to see if agent occupancy has changed. If the agent occupancy is down, the system administrator can drill into an auxiliary state report that shows the various states of agents in the contact center. Alternatively, the system administrator may view an agent utilization or occupancy report 700 as shown in FIG. 7. The agent utilization summary report 700 generally depicts the percentage of agent activity during a selected time interval. In the depicted example, the selected time interval is between 11:45 and 12:00. The agent utilization summary report 700 shows how agent utilization has changed over the selected time interval by various states available to the agent. The agent utilization summary report 700 generally includes preview duration, active duration, wrap-up duration, idle duration, initiate duration, and held duration as a percentage of total duration.

In the depicted example, the percentage of active duration increased from about 65% to about 70% between 11:45 and 12:00. Furthermore, percentage wrap up duration increased from about 10% to about 15% over the same time interval. The percentage idle duration decreased from about 15% to about 5% between 11:45 and 12:00. The slight increase in active duration and wrap-up duration may have been a result of local occurrences or may be the result of inefficient contact handling by an agent.

Figure 8:
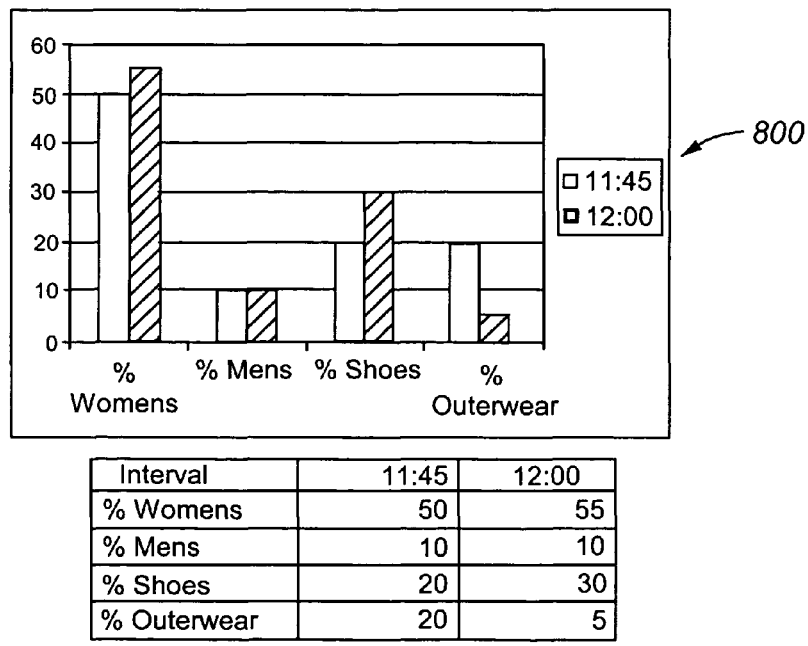
FIG. 8 is an agent queue utilization summary report graph and table in accordance with embodiments of the present invention.

In one embodiment, if the percent active time is about the same over the selected duration, then the system administrator can drill down to an agent queue utilization summary report 800 to see what queues the agents are serving, as can be seen in FIG. 8. The agent queue utilization summary report 800 generally shows from what queues agents are receiving contacts. In the depicted embodiment, the shoes queue took agents away from the outerwear queue. This dramatic change in agent utilization among queues may have been due to a change in skill levels at the CMS 228 and/or agent and contact selector 220. Upon seeing such a change in agent utilization, a system administrator may view a system administration history to see if skill levels were previously changed for agents serving shoes. In the event that a skill level change for agents in shoes was made, the system administrator or the event manager 232 may reverse the change to restore contact center performance.

In an alternative embodiment, if the percent wrap-up time or percent held duration time changed, then the system administrator may be provided agent problem behavior reports. Examples of agent problem behavior reports are described in U.S. patent application Ser. No. 11/193,585, the entire disclosure of which is hereby incorporated herein by this reference. The agent problem behavior reports may provide the system administrator information on how particulars agent can be coached to improve their contact handling efficiency.

Of course, service level may not be the only performance measurement parameter that has suffered as a result of contact center changes. Match rate is another indicator used to measure performance levels. The match rate sets of reports available for a system administrator to drill down through are somewhat similar in nature to the service level reports described above.

Figure 9:
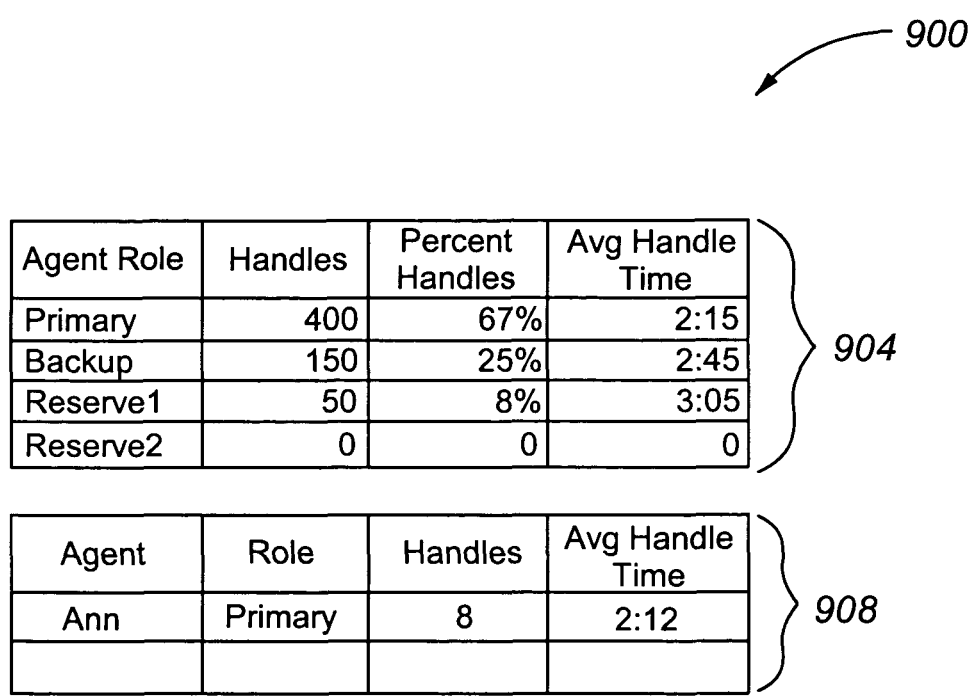
FIG. 9 is a queue agent role summary report table in accordance with embodiments of the present invention.

In one embodiment, if the system administrator or event manager 232 determines that a change has occurred in match rate, then a queue agent role summary report 900 may be generated as can be seen in FIG. 9. The queue agent role summary report 900 generally comprises a total queue information section 904 and an agent information section 908. The queue information section 904 shows agents' roles within a particular queue (e.g., outerwear). It is preferable to have the queue populated in large part with primary skill level agents. There may also be secondary or backup skill level agents as well as reserve agents. The information shown in the queue information section 904 indicates the number of contacts received on a per skill level basis. The queue information 904 further shows the percent handles for the entire queue by skill level and the average handle time for each skill level. If the ratio of skill levels handling contacts is not at an optimum level, for example if the backup skill level agents are handling more contacts than the primary skill level agents, then the system administrator can drill down through performance reports to determine if a system change resulted in the improper handling ratio. The system administrator can drill down into various reports that show different performance parameters including, without limitation, staff, primary staffing, occupancy, primary occupancy, queue state, possible reasons for primary and reserve agents, number of agents logged out, number of agents working on other work, and administration changes (e.g., workflow changes, vector changes, IVR changes, queue assignments, etc.).

Instead of requiring the system administrator to drill down through different reports, the event manager 232 may automatically drill down through each report. By drilling down through various performance parameters the event manager 232 is operable to identify a root cause of a change in contact center performance and may further provide suggestions to a system administrator to correct such changes, if necessary. Alternatively, the event manager 232 may automatically adjust certain contact center parameters to correct the problem and notify an administrator of actions taken.

Figure 10:
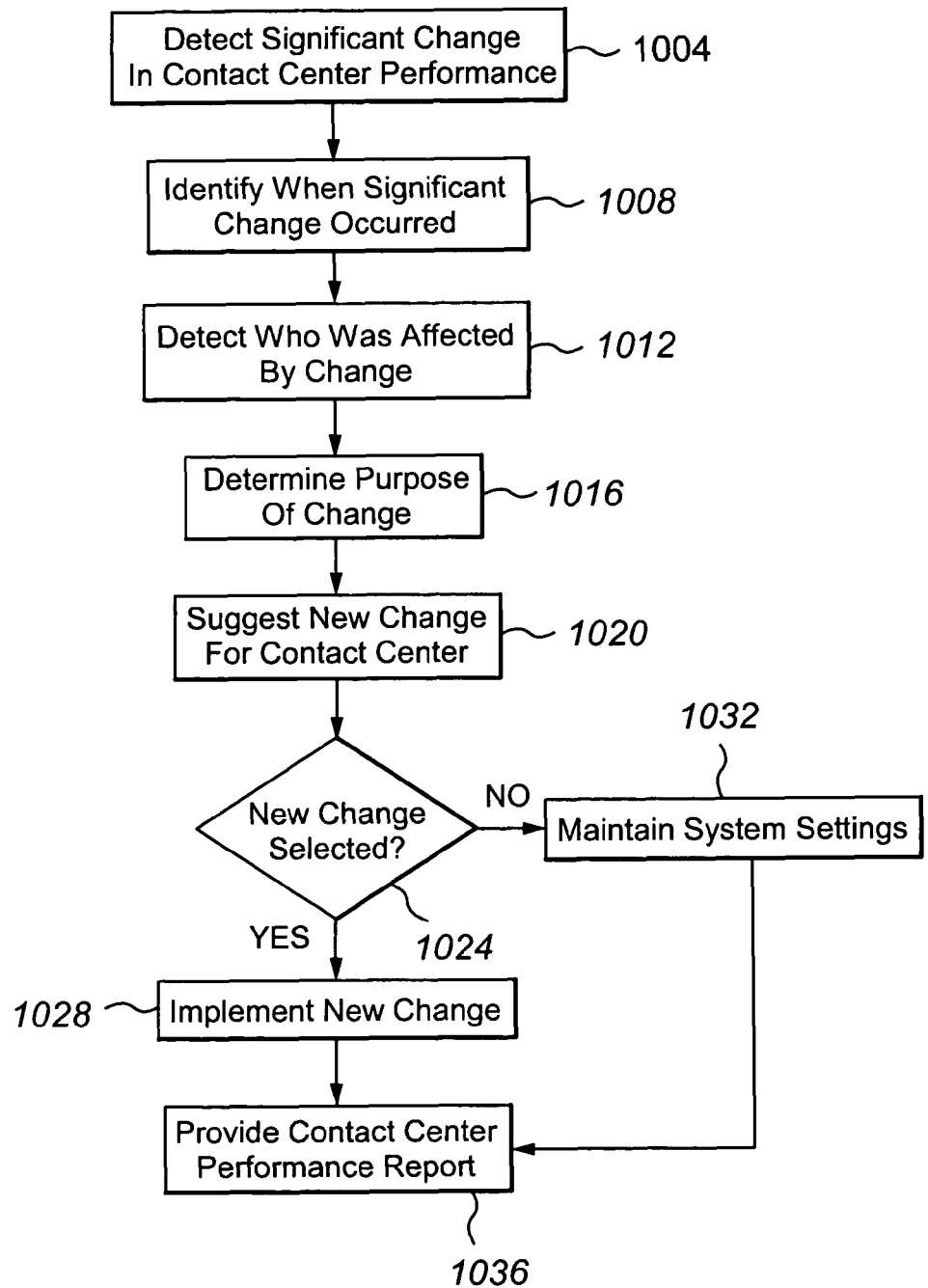
FIG. 10 is a flowchart depicting a method of responding to changes in contact center performance in accordance with embodiments of the present invention.

Referring now to FIG. 10, a method of responding to changes in contact center performance will be described in accordance with at least some embodiments of the present invention. The method begins by detecting a significant change in contact center performance as evidenced by a first or primary parameter (e.g., service level, match rate, percent abandon, or average speed of answer) (step 1004). A significant change may be defined as a percentage change and/or when a change is statistically significant within a particular time interval. An exemplary percentage change threshold may be if the service level and/or match rate changes by more than about +/−5% from the previous time interval measurement. An exemplary standard deviation threshold may be defined by the previous five time intervals. For instance, the previous five time intervals may have an average value of about 81% within service level. The standard deviation for those five values may be about +/−7%. Thus, the threshold for a significant change may be the standard deviation of the previous five values. Of course, a significant change may also be defined as any multiple or fraction of a standard deviation, depending upon user-defined tolerances. It should be noted that the thresholds are generally dynamic, in that they depend upon changing data. In the example above, when a new data point is added for a new time interval, the oldest of the five time interval values may be removed from the determination of a standard deviation and a new standard deviation may be calculated based on the new five most recent time interval measurements.

After a significant change has been detected, it is determined when the significant change occurred in the primary parameter (step 1008). This particular step helps to create a time line and a starting point for the drill-down reports described above. Moreover, determining when a significant change occurred can be useful in determining causal relationships. For example, a change in system parameters (or secondary parameters) after a significant change has been detected is not a likely cause of the significant change. Examples of secondary parameters include, but are not limited to, traffic, routing, staffing, occupancy, queue assignment, and any other contact center parameter that can change the operation or performance of the contact center.

It may also be informative to determine what queues were affected by the significant change. In step 1012, this particular determination is made regarding the parties affected by the significant change. For example, if one queue had a significant increase in performance at about the same time another queue had a significant decrease in performance, it could be the case that a queue assignment or vector change was implemented involving one of the two affected queues.

If a cause of the significant change can be identified, and the cause was at least partially due to a change in contact center parameters (or secondary parameters), it is determined what the purpose of the change was (step 1016). In some instances this determination may be speculative. For example, if records indicate that a fire drill was scheduled around the time the significant change was detected, then the reason for the parameter change may be related to that event. However, in accordance with some embodiments, a system administrator may be required to enter a reason for a system (secondary) parameter change. Thus, when the event manager 232 is searching for changes that resulted in a decrease/increase of performance, it may be able to definitively identify the reason for the change.

Based on the determined reason for the change and other factors, the event manager 232 may identify a set of possible causes of the change in system performance. Based on these causes, the event manager 232 may suggest a new parameter change for the contact center (step 1020). The suggestion for a change may be as simple as reversing the change that caused the alteration in performance. However, under certain circumstances, the change may not be reversible and the event manager 232 may supply other alternatives for changing contact center parameters. In some embodiments, the identified reasons for change may help determine if a particular change may be reversed.

The suggestions are provided by the event manager 232 to a system administrator. The suggestions may be provided in the form of an email or some other alert notification. The event manager 232 waits for a response from the system administrator to determine what changes should be made (step 1024). Of course, in certain embodiments, a system administrator may provide the event manager 232 standing instructions to reverse any reversible change that negatively affected contact center performance. This way a system administrator is only asked to make decisions regarding non-reversible changes.

If the event manager 232 receives notification from the system administrator that one or more of the suggested changes should be implemented, then the event manager 232 implements the new changes (step 1028). This particular step may include changing queue and/or vector assignments, adjusting the WFM forecasts, changing staffing, and the like. Thereafter, a contact center performance report may be generated for the system administrator (step 1036). Of course, the report may be provided to the system administrator as a part of the change suggestions. The report provided to the system administrator after the change is implemented may include a performance comparison report showing that the system has at least returned back to normal performance levels, or the performance levels have improved since a prior decrease in performance.

In the event that the system administrator either does not respond to the suggestions for changes or declines the suggestions, the system settings are maintained (step 1032). This essentially means that the contact center will continue running under the parameters that resulted in the change to contact center performance. Thereafter, the contact center performance report may be provided to the system administrator showing that no changes were made and further showing the updated levels of contact center performance (step 1036).

Figure 11:
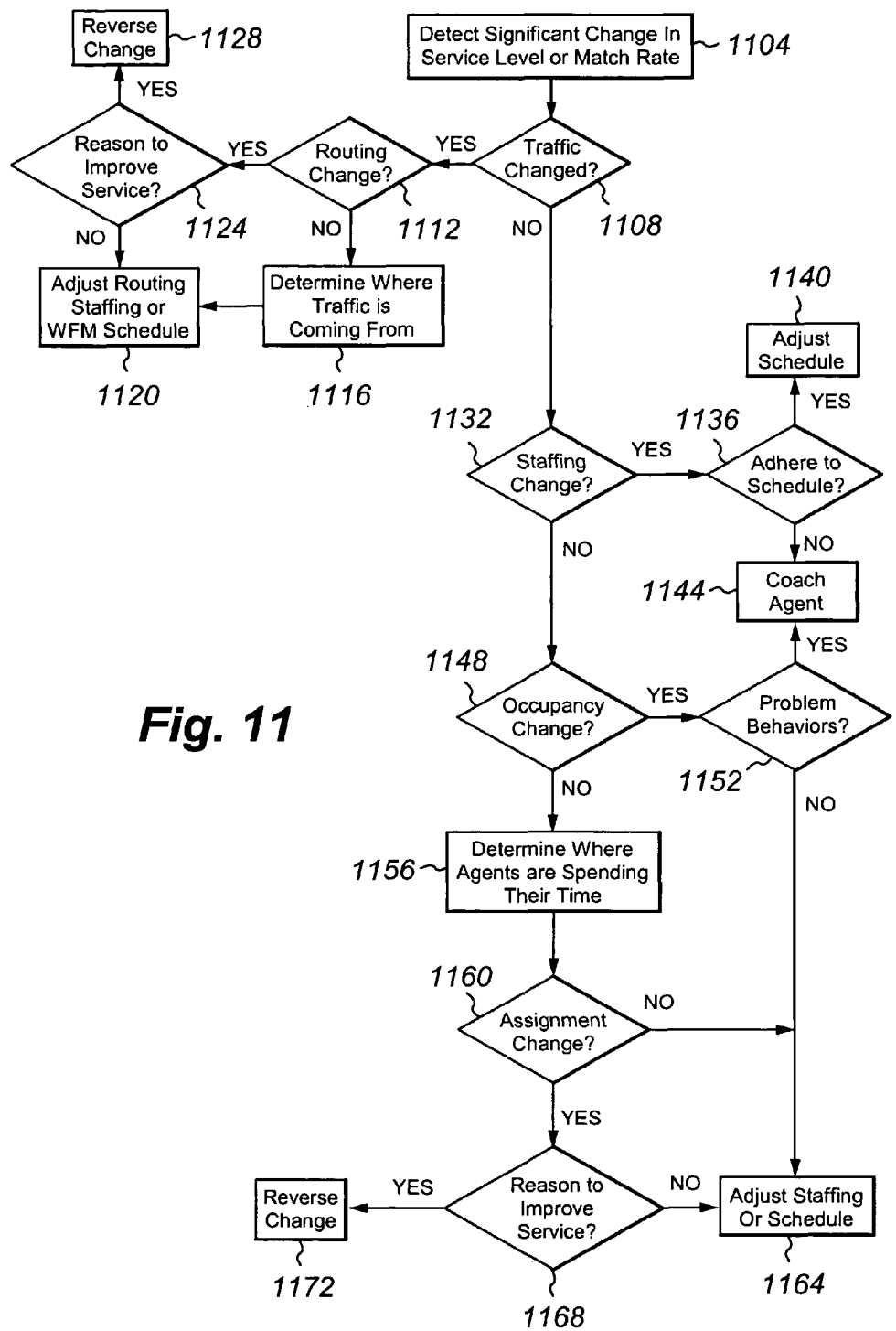
FIG. 11 is a flowchart depicting a method of determining a cause of a contact center performance change in accordance with embodiments of the present invention.

With reference now to FIG. 11, a method of determining a root cause of a performance change will be described in accordance with at least some embodiments of the present invention. The method begins when a significant change is detected in system performance or a primary parameter (step 1104). This particular step is similar to step 1004 described above. The change in performance may have been measured in either service level, match rate, both, or other indicators of contact center performance like percent abandon and average speed of answer. Once a significant change has been detected, it is determined if a secondary parameter such as traffic levels have changed (step 1108). The types of traffic that could have changed can include both inbound and outbound contacts from a particular queue or the entire contact center. One reason why traffic may change is because routing has been adjusted in the form of a queue change or a vector change. Thus, it is determined if a secondary parameter such as a routing change was made in temporal proximity before or around the time of the detected performance change (i.e., the target time) (step 1112). In the event that the traffic changed as a result of a routing change, it is determined if the routing change was made in an attempt to improve service level, match rate, and/or any other primary parameter (step 1124). If the routing change was made in an attempt to improve service level, match rate, and/or any other primary parameter, then the routing change is reversed (step 1128). As can be appreciated, the routing change could be automatically reversed by the event manager 232 or by a system administrator.

In one embodiment, a change in one secondary parameter may have been intended to improve service level numbers for a particular customer. Such a local change may have a negative impact on contact center performance globally. If an attempt to improve service locally resulted in a global degradation of service, the change may be reversed as noted above with respect to step 1128. As can be appreciated by one of skill in the art, hysteresis can be built into the system such that one parameter change is not continually reversed then reversed again. This hysteresis allows one parameter change to take effect on the contact center performance before the determination to make another change to the system is made.

In another embodiment, rather than simply reversing the last system change that may have resulted in the change of performance, system setting could be restored to a baseline configuration. In other words, the system may be restored to a "last known" working state having a predetermined setting for agent queue and vector assignments. The event manager 232 can decide to swing to this predetermined configuration if there are too many changes that need to be analyzed and reversed.

There are a number of instances where a routing change may have been made without intending to improve service. Some of these reasons may still provide a reversible routing change, whereas others may indicate that the routing change should not be reversed. For example, if a routing change was made to accommodate a mandatory staff meeting, then the routing change cannot be reversed until the staff meeting is over. Another example of a potentially irreversible routing change is if the queue assignment change was made to compensate for an agent that just wasn't qualified to handle a particular queue. In the event that the routing change should not be reversed (i.e., the routing change was not made to improve service), then other options are explored like changing other routing parameters, changing staffing, or changing the WFM schedule (step 1120). Another example of a change that should not necessarily be reversed is a change in system settings to accommodate for a sudden increase in traffic in a certain queue. Such a change may remain temporarily until the local traffic in a particular queue has returned to normal. Thereafter, the event manager 232 may reverse the change sending the system settings back to their previous state.

In the event that there was a traffic change but no routing change as determined by steps 1108 and 1112 respectively, a determination is made as to where traffic is coming from (step 1116). In other words, it is determined if the increase in traffic is from a particular customer, region, queue, or the like. After the origination of the traffic is determined, then suggestions are provided to adjust routing, adjust staffing, or change the WFM schedule (step 1120).

In the event that traffic did not substantially change, the method continues by determining if a secondary parameter such as staffing changed in temporal proximity before and/or around the target time (step 1132). Examples of a staffing change may be in preparation for an expected contact volume change or in preparation for a holiday. If it is determined that a staffing change was made, then it is determined if the changed schedule was adhered to (step 1136). In other words, it is determined if the scheduled agents showed up for work. In the event that the agents did adhere to the changed schedule, then the problem is in the schedule itself and therefore a suggestion is made to adjust the schedule (step 1140). In other words, the workflow forecast may have been off and therefore an adjustment to the schedule should be made.

However, if the workflow was forecast properly but the agents did not adhere to the schedule then other forms of adjustment should be made. For example, if agent's were coming in to work late or leaving early, then they may need to be coached or otherwise spoken with by a supervisor (step 1144). Alternatively, some agents may have been sick and the deviation from the schedule was unavoidable. Under these circumstances there may be no recourse for adjusting the system parameters but rather the system administrator must make adjustments to deal with an understaffed workforce.

If there was no determined traffic change and no staffing change, then the method continues to determine if there was a significant change in a secondary parameter such as agent occupancy (step 1148). As noted above, occupancy is an indicator of agent efficiency and provides a measure of how busy a particular agent is. Examples of an occupancy change include, longer or shorter talk times, longer or shorter hold times, longer or shorter wrap-up times, and/or longer or shorter ring times. Also, depending on how occupancy is calculated, breaks and non-contact work may affect occupancy as well.

In the event that an occupancy change is detected around the time that a significant change in performance (a primary parameter) was detected, then it is determined if there are any problem behaviors with one or more of the agents in the workforce (step 1152). Examples of methods used to determine if there are agent behavior problems are explained in U.S. patent application Ser. No. 11/193,585. If there were problem behaviors detected, then the identified agent is coached on how to handle contacts with more efficiency (step 1144). Other forms of coaching an agent include motivating the agent by giving them a different shift or discussing other options that would make the agent more willing to work efficiently. Also, the agent may have his or her work observed for a period of time to determine with more accuracy what their problem behaviors are.

In the event that there are no problem behaviors detected, then there is either a problem with the number of agents staffed or the schedule, which are both secondary parameters. Therefore, the staffing or schedule is adjusted (step 1164). This particular step may include adjusting the WFM forecast to accommodate for the occupancy change. Alternatively, the staffing may need to be changed by having agents work overtime, do split shifts, or assigning agents new queues.

If there have been no significant determined traffic changes, staffing changes, or occupancy changes, then it is determined where agents are spending their time (step 1156). For example, if before a particular decline in service agents were distributed across three queues relatively evenly then after a decline the distribution had more agents in the first two queues, then the agents are possibly spending too much time in the first two queues and should be redistributed among all queues.

Once it is determined where the agents were spending their time, then it is determined if there was an assignment change (a secondary parameter) (step 1160). Examples of a queue assignment change include, without limitation, increasing an agent's skill level, decreasing an agent's skill level, adding a queue, and removing a queue. If there were no queue assignment changes, then the problem is still likely in the staffing and/or schedule. Therefore, if no queue assignment change was detected, then the staffing and/or schedule is adjusted (step 1164).

However, if there was an assignment change, then it is determined if the reason for the assignment change was to improve service, either locally or globally (step 1168). If the reason for the change was to improve service, or was any other reversible reason, then the change is reversed and the system parameters are restored to their last known working condition (step 1172). However, if the reason for the change should not be reversed, then the staffing and/or schedule needs to be changed (step 1164). Additionally, other routing parameters may be changed to compensate for the other change that should not be reversed (not shown).

Figure 12:
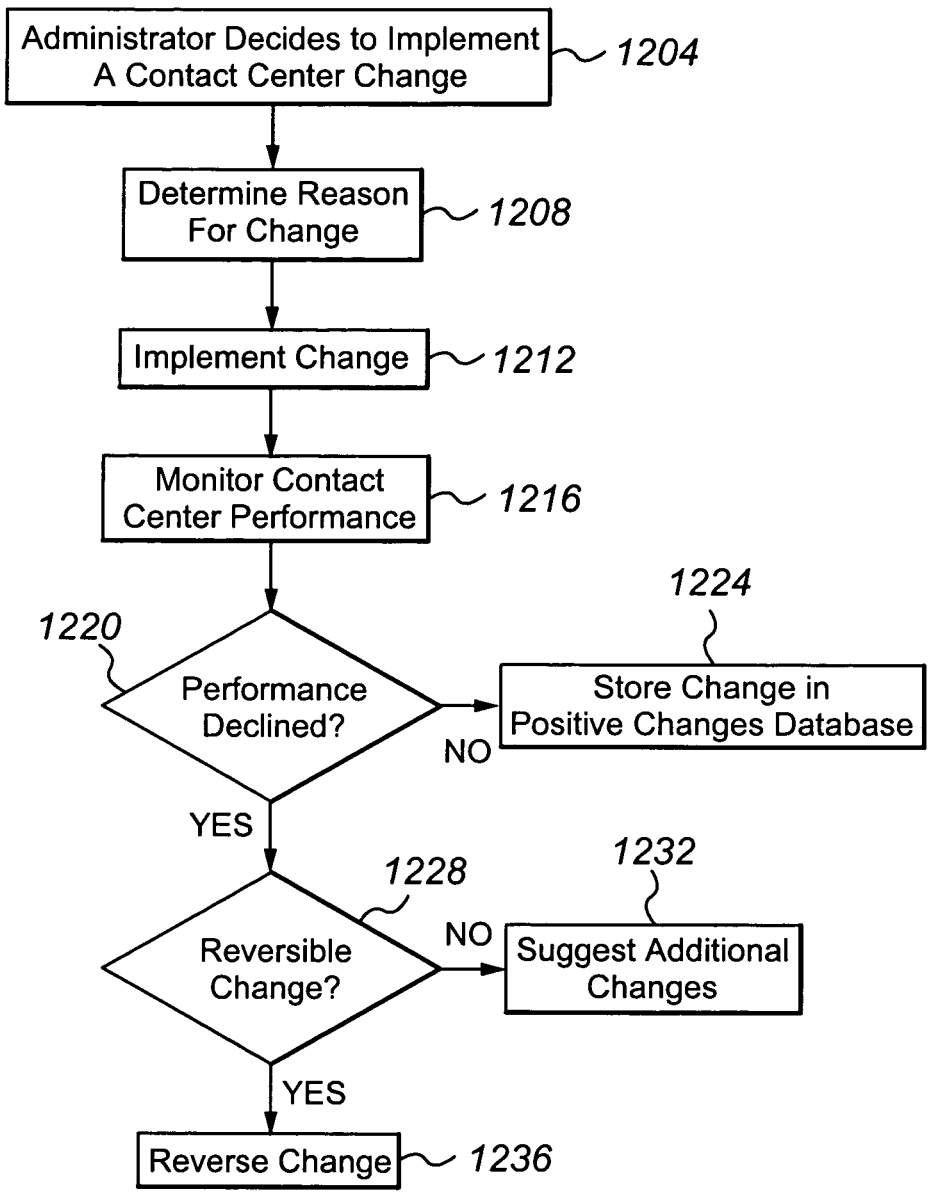
FIG. 12 is a flowchart depicting a method of maintaining a database of positive and negative contact center parameter changes in accordance with embodiments of the present invention.

FIG. 12 depicts a method of maintaining a database of positive system changes in accordance with at least some embodiments of the present invention. Initially, an administrator decides to implement a change to one or more the contact center parameters (step 1204). The change may include a staffing change, a schedule change, a queue assignment change, a vector change, or any other change known in the art. Thereafter, the administrator records the reason for the change (step 1208). The administrator may choose among various options for a reason of change, such as to improve service, to compensate for understaffing, to comply with new regulations, etc.

Once the reason for the change is known, the event manager 232 implements the change as defined by the system administrator (step 1212). Then the performance level of the contact center is monitored (step 1216). The performance level may be monitored by tracking the service level, match rate, both, or some other primary parameter. As the performance level of the contact center is monitored, it is determined if the performance level has declined (step 1220). If the performance level has not declined (i.e., it has improved or remained the same), then the event manager stores the positive change, the system parameters before the change, the system parameters after the change, and the reason for the change in the database 114 (step 1224). The positive change is preferably added to a positive change history log that can be accessed by the event manager 232 at a later time to create suggestions for future changes to the system administrator. For example, if the event manager 232 has noticed that a particular system change worked multiple times in the past for a specified set of contact center parameter settings, then if the same set of parameter settings are encountered at a later date, the event manager 232 can suggest the same changes to the system administrator with a reasonable amount of assurance that the performance will improve. The use of a positive change history log allows the event manager 232 to learn what types of system changes provide positive results. This is particularly useful when a change to the system parameters should not be reversed and a new change needs to be suggested to the system administrator.

The change may also be stored as a positive change if no change in performance was detected. This may be useful if the administrator changed system parameters to make a particular agent or agents happier as they worked. If no degradation to performance was detected as the result of such a change it may be regarded as a positive change and can therefore be stored in the positive changes history log along with its reason for the change.

It may also be useful to store negative changes in some circumstances in a negative change database. Specifically, a database of previous negative changes may be referenced to identify if the requested change may likely result in a decrease in contact center performance.

If there was a decline in performance detected by monitoring a primary parameter, then it is determined if the change is reversible (step 1228). If the change should not be reversed, then the event manager 232 can access the positive changes history log and suggest additional changes to the system parameters (step 1232). However, if the change was reversible, then the change is reversed and the system parameters are restored to their previous state (step 1236). The ability to change parameters and have the event manager 232 either automatically reverse them if they are bad or store them for future reference if they are good provides the system administrator the ability to learn how to work with the contact center. This learning tool also provides the event manager 232 with more information which can ultimately help the system administrator when other changes in system performance are detected.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing contacts in a contact center comprising an automated event manager executed by a processor of a contact center server, the method comprising:
   during operation of the contact center, storing working state information which comprises settings for agent queue and vector assignments;
   the event manager detecting at least a predetermined level of change in a primary contact center performance parameter;
   the event manager determining a time when the predetermined level of change in the primary contact center performance parameter occurred;
   in response to detecting the change in the primary contact center performance parameter, the event manager identifying a change in a secondary contact center parameter that occurred before the determined time of the change in the primary contact center performance parameter, but no more than a selected time period before the determined time, wherein the primary contact center performance and secondary contact center parameters are different, and wherein the change in the secondary contact center parameter is a possible cause of the change in the primary contact center performance parameter;
   determining that the at least one change in the secondary contact center parameter comprises a reversible change and then, in response to determining that the at least one change in the secondary contact center parameter comprises a reversible change, automatically reversing the reversible change by using type 2 data; and
   in response to identifying the change in the secondary contact center parameter, the event manager performing at least one of the following substeps:
      notifying a contact center administrator of the identified change in the secondary contact center parameter as a possible cause of the detected change in the primary contact center performance parameter; and
      automatically re-configuring the contact center to operate in conformance with a working state defined by working state information stored prior to the selected time period before the determined time.

2. The method of claim 1, wherein the change in the primary contact center performance parameter is identified as a negative change in at least one of contact center percent in service level, percentage abandon, average speed of answer, expected wait time, and match rate.

3. The method of claim 2, wherein detecting a predetermined level of change in the primary contact center performance parameter comprises:
   comparing the primary contact center performance parameter to at least one of an expected contact center performance parameter and a historical record of contact center performance parameters; and
   determining that the primary contact center performance parameter deviates from the at least one of an expected contact center performance parameter and historical record of contact center performance parameters by a predetermined threshold.

4. The method of claim 3, wherein the predetermined threshold comprises at least one of a standard deviation and a percent change from the at least one of an expected contact center performance parameter and historical record of contact center performance parameters.

5. The method of claim 1, wherein determining that the at least one change comprises a reversible change comprises:
   identifying that contact center traffic has substantially changed; and
   determining that a routing change was made in an attempt to improve service.

6. The method of claim 1, wherein determining that the at least one change comprises a reversible change comprises:
   identifying that contact center traffic has not substantially changed;
   determining that a substantial staffing change has not occurred;
   determining that a substantial occupancy change has not occurred; and
   determining that an assignment change was made in an attempt to improve service.

7. The method of claim 1, further comprising:
   transmitting a message to a system administrator that asks if the system administrator would like to re-configure the at least one change in the secondary contact center parameter; and
   the system administrator verifying that the at least one change in the secondary contact center parameter should be re-configured.

8. The method of claim 1, wherein the secondary contact center parameter comprises at least one of a queue assignment and contact vector.

9. A non-transitory computer readable medium comprising executable instructions for performing the method of claim 1.

10. A method for servicing contacts in a contact center comprising a plurality of agents, the method comprising:
    during operation of the contact center, storing working state information which comprises settings for agent queue and vector assignments;
    a processor detecting a negative change in at least one primary contact center performance parameter;
    the processor determining a time when the negative change in at least one primary contact center performance parameter occurred;
    the processor providing a system administrator a list of possible secondary contact center parameter changes, the list of possible secondary contact center parameter changes determined by an automated event manager identifying a secondary contact center parameter change which preceded the determined time of the negative change in the at least one primary contact center performance parameter;
    the processor determining the change in the secondary contact center parameter comprises a reversible change and then, in response to determining that the change in the secondary contact center parameter comprises a reversible change, automatically reversing the reversible change by using type 2 data, thereby enabling the processor to re-configure
    the contact center to operate in conformance with a working state defined by working state information stored prior to the determined time of the negative change.

11. The method of claim 10, further comprising:
    the system administrator selecting the at least one secondary contact center parameter change from the list of possible changes.

12. The method of claim 11, further comprising providing the system administrator a report of historical contact center performance and potential reasons for the detected negative change in contact center performance.

13. The method of claim 12, wherein the report comprises a first set of reports based on a negative change in contact center service level, and wherein the report comprises a second set of reports based on a negative change in contact center match rate, wherein both the first and second sets of reports suggest causes that have a higher probability of being a root cause of the negative change in contact center performance and further provide suggestions for correcting the negative change in contact center performance.

14. The method of claim 13, further comprising:
    determining that the negative change in contact center performance resulted from a negative change in service level; and
    providing the system administrator the first set of reports.

15. The method of claim 13, further comprising:
    determining that the negative change in contact center performance resulted from a negative change in match rate; and
    providing the system administrator the second set of reports.

16. A non-transitory computer readable medium comprising executable instructions for performing the method of claim 10.

17. A system for managing contact center performance, comprising:
    a server comprising:
       at least one input for measuring a primary contact center performance parameter;
       a memory;
       a processor in communication with the memory, the processor operable to execute an event manager, the event manager operable to:
          during operation of the contact center, store working state information which comprises settings for agent queue and vector assignments;
          detect a change in at least one primary contact center performance parameter from the at least one input;
          determine a time when the change in at least one primary contact center performance parameter occurred;
          identify at least one change in a secondary contact center parameter that occurred prior to the determined time of the detected change in the primary contact center performance parameter, but no more than a selected time period before the determined time; and
          in response identify at least one change in a secondary contact center parameter, automatically re-configure the contact center to operate in conformance with a working state defined by working state information stored prior to the selected time period before the determined time, wherein the at least one change comprises a first change to a secondary contact center parameter, and wherein the event manager is operable to reverse the first change by altering type 2 data.

18. The system of claim 17, wherein the event manager is operable to modify at least one secondary contact center parameter comprising at least one of a queue assignment and contact vector.

19. The system of claim 17, wherein the event manager is operable to suggest at least one of a staffing change, schedule change, routing change, and queue assignment change for a system administrator based on the detected change in the primary contact center performance parameter.

20. The system of claim 17, wherein the event manager is operable to compare the primary contact center performance parameter to at least one of an expected contact center performance parameter and a historical record of contact center performance parameters and determine that contact center performance deviates from the at least one of an expected contact center performance parameter and historical record of contact center performance parameters by a predetermined threshold.

21. The system of claim 20, wherein the predetermined threshold comprises at least one of a standard deviation and a percent change from the at least one of an expected contact center performance parameter and historical record of contact center performance parameters.

22. The system of claim 17, wherein the primary contact center performance parameter comprises at least one of percent in service level, match rate, percent abandon, expected wait time and average speed of answer.

23. The system of claim 17, wherein the secondary contact center parameter comprises at least one of traffic change, routing change, staffing change, occupancy change, and queue assignment change.

24. The system of claim 17, further comprising a database containing at least one change that was made to a secondary contact center parameter in the past and resulted in a positive change in a primary contact center performance parameter, and wherein the server is operable to reference the database prior to modifying the at least one secondary contact center parameter to compensate for the at least one change.

* * * * *